US00RE41993E

(19) United States
(12) Reissued Patent
Yuen et al.

(10) Patent Number: US RE41,993 E
(45) Date of Reissued Patent: Dec. 7, 2010

(54) APPARATUS AND METHOD FOR IMPROVED PARENTAL CONTROL OF TELEVISION USE

(75) Inventors: Henry C. Yuen, Pasadena, CA (US); Roy J. Mankovitz, Calabasas, CA (US); Daniel S. Kwoh, La Canada, CA (US)

(73) Assignee: Gemstar Development Corporation, Pasadena, CA (US)

(21) Appl. No.: 10/720,006

(22) Filed: Nov. 20, 2003

(Under 37 CFR 1.47)

Related U.S. Patent Documents

Reissue of:
(64) Patent No.: 6,321,381
Issued: Nov. 20, 2001
Appl. No.: 09/558,536
Filed: Apr. 26, 2000

U.S. Applications:

(63) Continuation of application No. 09/344,634, filed on Jun. 25, 1999, now Pat. No. 6,072,520, which is a continuation of application No. 08/684,678, filed on Jul. 19, 1996, now Pat. No. 5,949,471, and a continuation of application No. 08/138,632, filed on Oct. 15, 1993, now abandoned, and a continuation-in-part of application No. 08/118,001, filed on Sep. 8, 1993, now Pat. No. 5,382,983, and a continuation of application No. 08/100,616, filed on Jul. 29, 1993, now abandoned.

(51) Int. Cl.
*H04N 5/445* (2006.01)
*H04N 7/087* (2006.01)

(52) U.S. Cl. ..... 725/28; 725/27; 348/569
(58) Field of Classification Search ..... 725/28, 725/27, 25, 29, 30, 116; 348/569, 563, 564, 348/567; *H04N 7/087, 5/445*
See application file for complete search history.

(56) References Cited

U.S. PATENT DOCUMENTS 2,700,065 A 1/1955 Evans
2,851,550 A 9/1958 Searcy
2,856,474 A 10/1958 Norris
4,012,583 A 3/1977 Kramer
4,079,419 A 3/1978 Siegle et al.
4,081,753 A 3/1978 Miller
4,081,754 A 3/1978 Jackson
4,156,850 A 5/1979 Beyers, Jr.
4,162,513 A 7/1979 Beyers, Jr. et al.
4,170,782 A 10/1979 Miller
4,225,884 A 9/1980 Block
4,228,543 A 10/1980 Jackson
4,247,743 A 1/1981 Hinton
4,288,809 A 9/1981 Yabe
4,305,101 A 12/1981 Yarbrough et al.

(Continued)

FOREIGN PATENT DOCUMENTS

AU B-21592/88 3/1989

(Continued)

OTHER PUBLICATIONS

Naniel F. Walsh Jr., Timing Considerations in RF Two Way Data Collection and Polling, Jerrold–Applied Media Lab, 1989 NCTA Technical Papers, pp. 47–56, 1989.

(Continued)

*Primary Examiner*—Sherrie Hsia
(74) *Attorney, Agent, or Firm*—Ropes & Gray LLP

(57) ABSTRACT

An apparatus and method for parental control of television programs. Program schedule information including program titles are stored in a memory and displayed on a monitor. Compressed code is entered for the programs to be blocked. Alternatively, one or more program titles are selected from the displayed program schedule information for blocking by a parental control circuitry connected to a controller.

73 Claims, 16 Drawing Sheets

U.S. PATENT DOCUMENTS

| | | | |
|---|---|---|---|
| 4,321,593 | A | 3/1982 | Ho et al. |
| 4,348,696 | A | 9/1982 | Beier |
| 4,355,415 | A | 10/1982 | George et al. |
| 4,390,901 | A | 6/1983 | Keiser |
| 4,425,579 | A | 1/1984 | Merrell |
| 4,429,385 | A | 1/1984 | Cichelli et al. |
| 4,495,654 | A | 1/1985 | Deiss |
| 4,510,623 | A | 4/1985 | Bonneau et al. |
| 4,536,791 | A | 8/1985 | Campbell et al. |
| 4,566,033 | A | 1/1986 | Reidenouer |
| 4,573,072 | A | 2/1986 | Freeman |
| 4,598,288 | A | 7/1986 | Yarbrough et al. |
| 4,604,708 | A | 8/1986 | Lewis |
| 4,605,964 | A | 8/1986 | Chard |
| 4,605,973 | A | 8/1986 | Von Kohorn |
| 4,620,229 | A | 10/1986 | Amano |
| 4,647,735 | A | 3/1987 | Sicher |
| 4,648,667 | A | 3/1987 | Baumgart |
| 4,685,131 | A | 8/1987 | Horne |
| 4,718,107 | A | 1/1988 | Hayes |
| 4,750,213 | A | 6/1988 | Novak |
| 4,768,229 | A | 8/1988 | Benjamin et al. |
| 4,823,385 | A | 4/1989 | Hegendorfer |
| 4,862,268 | A | 8/1989 | Campbell et al. |
| 4,885,775 | A | 12/1989 | Lucas |
| 4,888,796 | A | 12/1989 | Olivio, Jr. |
| 4,890,320 | A | 12/1989 | Monslow et al. |
| 4,890,321 | A | 12/1989 | Seth-Smith |
| 4,903,031 | A | 2/1990 | Yamada |
| 4,930,158 | A | 5/1990 | Vogel |
| 4,930,160 | A | 5/1990 | Vogel |
| 4,994,908 | A | 2/1991 | Kuban et al. |
| 4,995,078 | A | 2/1991 | Monslow et al. |
| 5,001,554 | A | 3/1991 | Johnson et al. |
| 5,021,916 | A | 6/1991 | Hubbard |
| 5,033,085 | A | 7/1991 | Rew |
| 5,038,211 | A | 8/1991 | Hallenbeck |
| 5,045,947 | A | 9/1991 | Beery |
| 5,046,125 | A | 9/1991 | Takizawa |
| 5,051,837 | A | 9/1991 | McJunkin |
| 5,053,797 | A | 10/1991 | Samuels et al. |
| 5,056,139 | A | 10/1991 | Littlefield |
| 5,068,734 | A | 11/1991 | Beery |
| 5,075,771 | A | 12/1991 | Hashimoto |
| 5,168,353 | A | 12/1992 | Walker et al. |
| 5,172,111 | A | 12/1992 | Olivo, Jr. |
| 5,206,722 | A | 4/1993 | Kwan |
| 5,210,611 | A | 5/1993 | Yee et al. |
| 5,223,924 | A | 6/1993 | Strubbe |
| 5,235,415 | A | 8/1993 | Bonicel et al. |
| 5,247,364 | A | 9/1993 | Banker et al. |
| 5,253,066 | A | 10/1993 | Vogel |
| 5,253,067 | A | 10/1993 | Chaney et al. |
| 5,260,778 | A | 11/1993 | Kauffman et al. |
| 5,317,391 | A | 5/1994 | Banker et al. |
| 5,357,276 | A | 10/1994 | Banker et al. |
| 5,371,795 | A | 12/1994 | Vogel |
| 5,382,983 | A | 1/1995 | Kwoh et al. |
| 5,384,910 | A | 1/1995 | Torres |
| 5,425,101 | A | 6/1995 | Woo et al. |
| 5,446,488 | A | 8/1995 | Vogel |
| 5,477,262 | A | 12/1995 | Banker et al. |
| 5,485,221 | A | 1/1996 | Banker et al. |
| 5,485,518 | A | 1/1996 | Hunter et al. |
| 5,548,345 | A | 8/1996 | Brian et al. |
| 5,550,575 | A | 8/1996 | West et al. |
| 5,579,055 | A | 11/1996 | Hamilton et al. |
| 5,583,560 | A | 12/1996 | Florin et al. |
| 5,583,576 | A | 12/1996 | Perlman et al. |
| 5,585,866 | A | 12/1996 | Miller |
| 5,592,551 | A | 1/1997 | Lett et al. |
| 5,594,509 | A | 1/1997 | Florin et al. |
| 5,621,456 | A | 4/1997 | Florin et al. |
| 5,751,335 | A | 5/1998 | Shintani |
| 5,781,246 | A | 7/1998 | Alten et al. |

FOREIGN PATENT DOCUMENTS

| | | |
|---|---|---|
| GB | 2 209 417 | 5/1989 |
| GB | 2 210 526 | 6/1989 |
| GB | 2 215 928 | 9/1989 |
| WO | WO 86/01962 | 3/1986 |
| WO | WO 89/12370 | 12/1989 |
| WO | WO 90/15507 | 12/1990 |
| WO | WO 93/11638 | 6/1993 |
| WO | WO 93/11639 | 6/1993 |
| WO | WO 93/11640 | 6/1993 |

OTHER PUBLICATIONS

"Addressable Converters: A New Development at Cable Data," Via Cable, vol. 1, No. 12, Dec. 1981, Cable Data, Sacramento, California.

"A New Approach To Addressability," CableData product brochure, Cable Data, Sacramento, California, undated.

V. Brugliera, "Digital On–Screen Display–A New Technology for the Consumer Interface," Symposium Record Cable Sessions of the 18th International Television Symposium & Technical Exhibition, Jun. 1993, pp. 571–586.

CableComputer User's Guide, bearing a date of Dec. 1985 (Plaintiff's Exhibit 289).

CableData, Roseville Consumer Presentation, Mar. 1986.

J. A. Chiddix et al., "Off–Premises Broad–Band Addressability: A CATV Industry Challenge," American Television and Communications Corporation, Stamford Connecticut 1989 NCTA Technical Papers, 1989, pp. 57–64.

M. Dufresne, "New Services: An Integrated Cable Network's Approach, Videotron Communication LTEE," Technical Papers of NCTA 31st Annual Convention & Exposition, pp. 156–160 (1982).

Jerrold Communications Publication, "Cable Television Equipment," dated 1992 and 1993, pp. 8–2.1 to 8–6 and 8–14.1 to 8–14.3.

G. Libman, "Times Staff Writer Chaining the Channels, A New Generation of Television Blocking Systems Allows More Options for Parent, Seeking to Control Kids' Viewing," Aug. 9, 1993.

M/A–COM, Inc., "Videocipher II Satellite Descrambler Owner's Manual," dated prior to Feb. 1986.

R. G. Merrell et al., "An Auto–Dialer Approach to Pay–Per–View Purchasing," Zenith Electronics Corporation Glenview, Illinois, 1989 NCTA Technical Papers, 1989, pp. 34–38.

Michael Dufresne, "New Services: An Integrated Cable Network's Approach, Videotron Communication LTEE," *Technical Papers of NCTA 31st Annual Convention & Exposition,* pp. 156–160 (1982).

Roseville City Council Presentation, bearing a date of Mar. 13, 1985 (Defendant's Exhibit 26).

D. H. Smart, "Innovative Aspects of a Switched Star Cabled Television Distribution System," British Cable Services Limited, 1987 NCTA Technical Papers, 1987, pp. 26–35.

G.F. Vaeth et al., "The Addressable Controller of the Future," General Instrument/Jerrold Communication, 1990 NCTA Technical Papers, 1990, pp. 274–279.

Videocipher Owner's Manual, M/A–Com., Publication No. 4096–048; Model No. VC–2000E OR VC–2000E/B, undated.

L. Walsh, Jr., "Timing Considerations in RF Two Way Data Collection and Polling," Jerrold–Applied Media Lab, 1989 NCA Technical Papers, 1989, pp. 47–56.

L. West et al., "Off Premises Technology Comparisons," Scentific Atlanta 1989 NCTA Technical Papers, 1989, pp. 39–56.

"Westar and Videotoken Network Present The CableComputer" (Plaintiff's Exhibit 334).

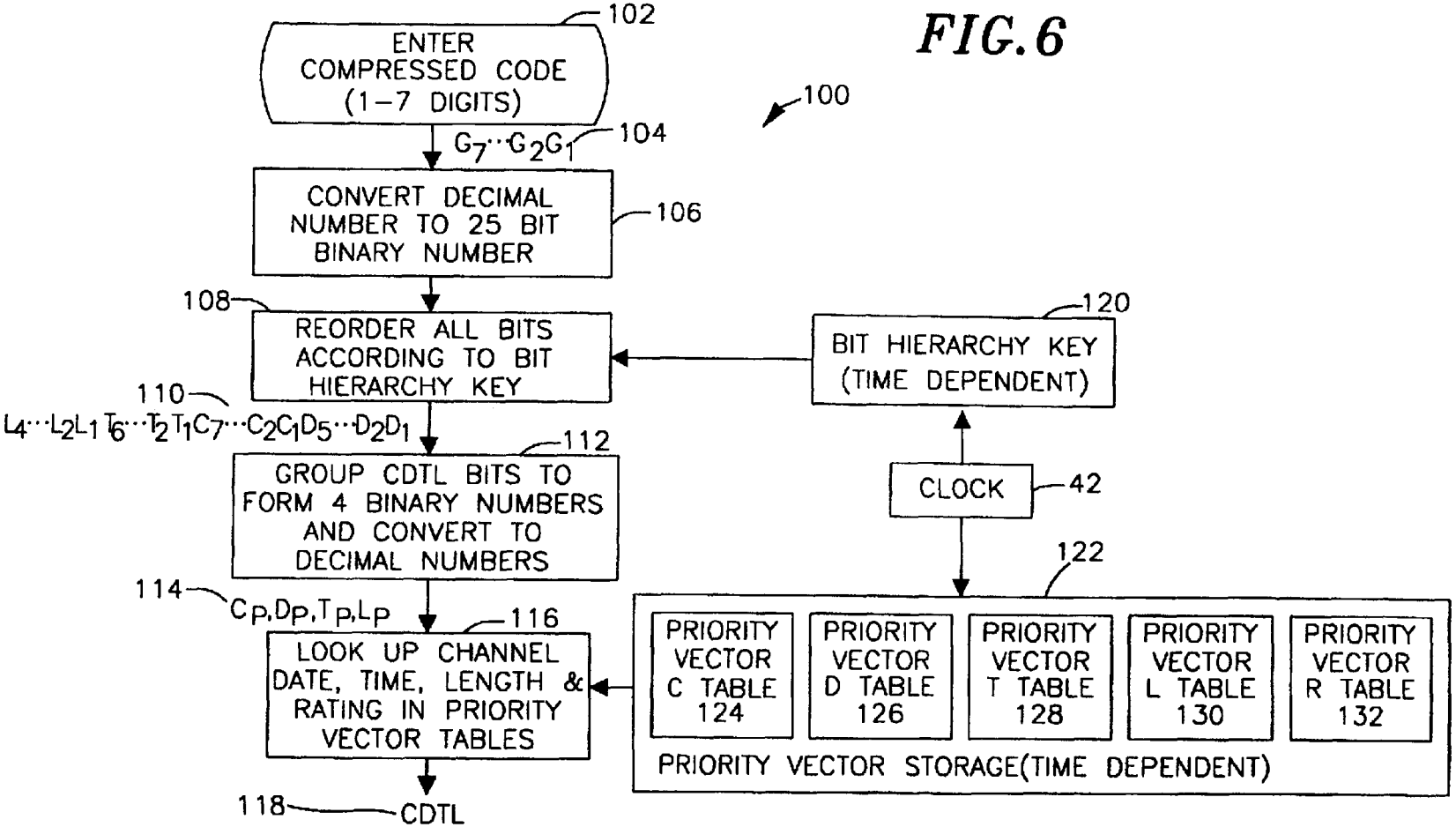
FIG. 6
100
102
ENTER COMPRESSED CODE (1–7 DIGITS)
104
$G_7 \cdots G_2 G_1$
106
CONVERT DECIMAL NUMBER TO 25 BIT BINARY NUMBER
108
REORDER ALL BITS ACCORDING TO BIT HIERARCHY KEY
110
$L_4 \cdots L_2 L_1 T_6 \cdots T_2 T_1 C_7 \cdots C_2 C_1 D_5 \cdots D_2 D_1$
112
GROUP CDTL BITS TO FORM 4 BINARY NUMBERS AND CONVERT TO DECIMAL NUMBERS
114
$C_P, D_P, T_P, L_P$
116
LOOK UP CHANNEL DATE, TIME, LENGTH & RATING IN PRIORITY VECTOR TABLES
118
CDTL
120
BIT HIERARCHY KEY (TIME DEPENDENT)
42
CLOCK
122
PRIORITY VECTOR C TABLE 124
PRIORITY VECTOR D TABLE 126
PRIORITY VECTOR T TABLE 128
PRIORITY VECTOR L TABLE 130
PRIORITY VECTOR R TABLE 132
PRIORITY VECTOR STORAGE(TIME DEPENDENT)

*FIG. 8*

PARENTAL CONTROL

THE FOLLOWING PROGRAMS ARE AVAILABLE FOR VIEWING

| | | |
|---|---|---|
| 4:30pm – 5:00pm | 4 | CARTOON EXPRESS (23561) |
| 5:00pm | 11 | L.A. LAKERS V. BOSTON CELTICS (0765) |
| 6:30pm – 7:00pm | 11 | FAMILY TIES (15657) |
| 7:00pm – 7:30pm | 2 | BEVERLY HILLBILLIES (49677) |

*FIG. 9*

PARENTAL CONTROL

TO USE PARENTAL CONTROL FEATURE,

ENTER YOUR IDENTIFICATION (ID) NUMBER

*FIG. 10*

PARENTAL CONTROL

YOU HAVE ENTERED AN UNAUTHORIZED ID NUMBER PLEASE RE-ENTER YOUR ID NUMBER

*FIG. 11*

PARENTAL CONTROL

THE ID NUMBERS ENTERED ARE NOT AUTHORIZED ID NUMBERS. THE T.V. WILL NOW BE DISABLED FOR A PERIOD OF TIME.

*FIG. 12*

PARENTAL CONTROL

| POSSIBLE SELECTIONS | TO MAKE SELECTION – PUSH |
|---|---|
| 1. ENABLED PROGRAMS | 1 |
| 2. BLOCKED PROGRAMS | 2 |
| 3. V BLOCK | 3 |
| 4. BLOCK CHANNEL | 4 |
| 5. REVIEW | 5 |
| 6. TO OVERRIDE FOR NORMAL T.V. VIEWING | 6 |
| 7. COMPARE FOR INCONSISTENCIES | 7 |

FIG. 13
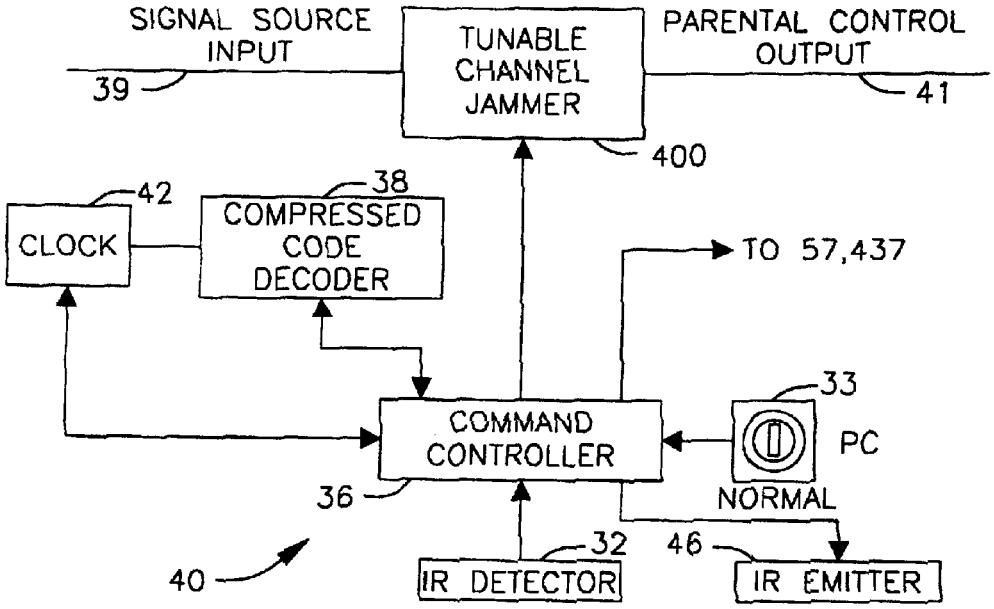
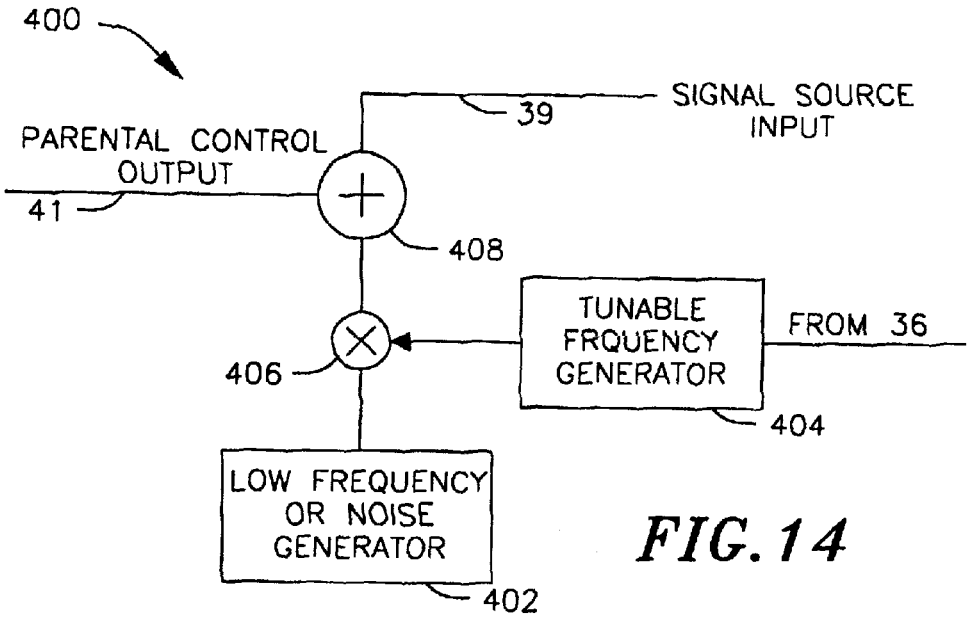
FIG. 14

APPARATUS AND METHOD FOR IMPROVED PARENTAL CONTROL OF TELEVISION USE

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation of patent application Ser. No. 09/344,634, filed Jun. 25, 1999 now U.S. Pat. No. 6,072,520, which is a continuation of U.S. patent application No. 08/684,678 filed Jul. 19, 1996, now U.S. Pat. No. 5,949,471, issued Sep. 7, 1999. which is a continuation of patent application Ser. No. 08/138,632 filed Oct. 15, 1993, abandoned, which is a continuation in part of patent application Ser. No. 08/118,001 (now U.S. Pat. No. 5,382,983 issued Jan. 17, 1995) filed Sep. 8, 1993, which is a continuation of patent application Ser. No. 08/100,616 (now abandoned) filed Jul. 29, 1993, incorporated herein by this reference, as though set forth in full.

BACKGROUND OF THE INVENTION

1. Field of the Invention

This invention relates generally to the controlled use of television receivers and particularly to parental control of the use of television receivers and associated equipment such as cable boxes.

2. Description of the Related Art

Parental control is presently available in some television receivers, video cassette recorders, and cable boxes on a limited basis. In these devices, certain channels may be locked out. However, the locking out of channels does not prevent children from spending excessive time watching television instead of studying or doing other things. Other devices limit the amount of time, but do not provide for selective viewing to prevent viewing of undesirable programs. One example of parental control at the television receiver is disclosed in U.S. Pat. No. 4,510,623 to Bonneau et al. A local oscillator for electronically tuning the television is controlled by a phase lock loop which is responsive to the output signal from a microprocessor. The microprocessor provides the output signal only if the selected channel has not been inhibited. To inhibit a channel for a period of time, the user enters a lockout code which is stored in a non-volatile memory. The memory provides one input to the microprocessor which is compared to the input by a user selecting a channel to be viewed. The microprocessor determines whether the selected channel is one of the inhibited channels and, if it is, does not generate the necessary signal for tuning to that channel.

Another prior art patent that discloses the blocking out of selected channels is U.S. Pat. No. 4,718,107 to John J. Hayes. The parental control disclosed in the Hayes patent is provided in a converter box. In this system, if the access code is forgotten, the converter box has to be taken to the business office of the CATV system to have the memory purged of the blocked-out channel information and the access code, and a new access code must be entered. In the Hayes device, only selected channels can be clocked which does not allow the selected blocking of particular programs in a channel.

In general, the present state of the art concerning parental control suffers from a number of drawbacks. In particular, the control is very limited and does not provide a parent the broad control desirable for controlling the viewing or use of a television by a child.

Some cable channels are scrambled and must be decoded by a cable box before being sent to a television tuned to channel 3 or channel 4. In this case, controlling the tuning of the television is ineffective, because the television is always tuned to channel 3 or 4. Even if a particular channel is blocked in the cable box or converter box, this does not provide the parent selective control over programs within a channel.

Accordingly, there is a need in the art for apparatus and methods for improved parental control of television use to provide a parent broad control for both blocking unacceptable programs and/or selecting acceptable programs that are available for viewing. There is also a need in the art for improved parental control of multiple televisions attached to a common signal source.

SUMMARY OF THE INVENTION

According to the present invention, apparatus and methods for improved parental control of television viewing are provided.

In an embodiment of the present invention, the apparatus includes means for blocking the viewing of programs, each having a program identifier, coupled to a television signal source and having a first output, cable box means for converting television signals coupled to the first output of the means for blocking, and means for selecting programs to be blocked coupled to the means for blocking.

In a specific embodiment the means for blocking further comprises means for decoding and expanding a compressed code, representative of, and compressed in length from, the combination of a channel, a date, a time-of-day, and a length for a program.

In another specific embodiment the apparatus further includes a clock for providing an output as a function of time coupled to the means for decoding and expanding, and the means for decoding and expanding a compressed code into channel, date, time-of-day and length performs the decoding and expanding as a function of the clock output.

In another specific embodiment the means for decoding and expanding the compressed code into channel, date, time-of-day and length further comprises means for converting the compressed code into a binary number, means for reordering the bits in the binary number to obtain a reordered binary compressed code, means for grouping the reordered binary compressed code into channel, date, time and length priority numbers, and means for using the channel, date, time and length priority numbers to derive the channel, date, time-of-day and length.

In yet another specific embodiment the means for blocking further comprises processor means for controlling the blocking of programs, a memory for authorized identification numbers coupled to the processor means, means coupled to the processor means for comparing the authorized identification numbers to an entered identification code, a memory for storing the program identifiers of selected programs to be blocked coupled to the processor means, and means for determining that a stored selected program identifier has a pre-determined relationship with a second output.

In a specific embodiment the means for determining further comprises a clock having date and time-of-day coupled to the second output.

In another specific embodiment the means for determining further comprises a program identifier coupled to the second output and retrieved from a signal from the television signal source.

In another specific embodiment the means for selecting programs to be blocked further comprises a remote controller, and means for receiving compressed codes via a telephone coupled to the remote controller.

In another specific embodiment the means for blocking comprises means for filtering from the output a channel for the length of time for the selected program to be blocked upon the occurrence of the pre-determined relationship.

In another specific embodiment the means for filtering comprises a plurality of filter means, each for blocking a channel in the television signal from the television signal source upon the occurrence of the pre-determined relationship.

In another specific embodiment the means for blocking further comprises means for jamming a channel for the length of rime for the selected program to be blocked upon the occurrence of the pre-determined relationship.

In yet another specific embodiment the means for jamming further comprises means for time multiplexing the means for jamming among a plurality of channels for selected programs to be simultaneously blocked upon the occurrence of the pre-determined relationship.

In another specific embodiment the means for jamming comprises a noise signal added to a channel to be blocked.

In yet another specific embodiment the means for jamming comprises a low frequency signal added to a channel to be blocked.

In a specific embodiment the means for blocking further comprises a key lock coupled to the processor means for choosing between blocking the selected programs or not blocking the selected programs.

In another specific embodiment the apparatus includes a first tamper proof connector for coupling the television signal source to the means for blocking.

In another specific embodiment the apparatus further includes a television receiver wherein the means for blocking is integral to the television receiver.

In yet another specific embodiment the means for blocking comprises means for filtering from the output a channel upon the occurrence of the pre-determined relationship.

In another specific embodiment the means for filtering comprises a plurality of filter means, each for blocking a channel in the television signal from the television signal source upon the occurrence of the pre-determined relationship.

In another specific embodiment the means for blocking further comprises means for jamming a channel upon the occurrence of the pre-determined relationship.

In yet another specific embodiment the means for jamming further comprises means for time multiplexing the means for jamming among a plurality of channels for selected programs to be simultaneously blocked upon the occurrence of the pre-determined relationship.

In another specific embodiment the means for jamming comprises a noise signal added to a channel to be blocked.

In another specific embodiment the means for jamming comprises a low frequency signal added to a channel to be blocked.

In another specific embodiment the apparatus of further includes means for retrieving from a television signal an indication of a program scene to be concealed from viewing, and means for blocking the program scene from a television monitor whenever an indication of a program scene to be concealed from viewing is retrieved from a television signal.

In yet another specific embodiment the means for retrieving from a television signal an indication of a program scene to be concealed from viewing comprises a vertical blanking interval decoder.

In another specific embodiment the apparatus further includes means for blocking a plurality of program scenes from a television monitor whenever the indication of a program scene to be blocked from reviewing is retrieved from a television signal.

In another specific embodiment the means for blocking further comprises a key lock coupled to the processor means for choosing between blocking the selected programs or not blocking the selected programs.

In another specific embodiment the apparatus further includes a fourth tamper proof connector for coupling the television signal source to the television receiver.

In another specific embodiment the apparatus further includes a power splitter means for driving a plurality of cable box means and/or television receivers coupled between the output of the means for blocking and the plurality of cable box means and/or television receivers.

In yet another specific embodiment the means for blocking comprises means for filtering from the output a channel to be blocked upon the occurrence of the pre-determined relationship.

In another specific embodiment the means for filtering comprises a plurality of filter means, each for blocking a channel in the television signal from the television signal source upon the occurrence of the pre-determined relationship.

In yet another specific embodiment the means for blocking further comprises means for jamming a channel upon the occurrence of the pre-determined relationship.

In another specific embodiment the means for jamming further comprises means for time multiplexing the means for jamming among a plurality of channels for selected programs to be simultaneously blocked upon the occurrence of the pre-determined relationship.

In a specific embodiment the means for jamming comprises a noise signal added to a channel to be blocked.

In another specific embodiment the means for jamming comprises a low frequency signal added to a channel to be blocked.

In another embodiment of the present invention an apparatus for parental control of television viewing includes means for enabling the viewing of programs, each having a program identifier, coupled to a television signal source and having a first output, cable box means for converting television signals coupled to the first output of the means for enabling, and means for selecting programs to be enabled coupled to the means for enabling.

In a specific embodiment the means for enabling further comprises means for decoding and expanding a compressed code, representative of, and compressed in length from, the combination of a channel, a date, a time-of-day, and a length for a program.

In another specific embodiment the apparatus further includes a clock for providing an output as a function of time coupled to the means for decoding and expanding, and the means for decoding and expanding a compressed code into channel, date, time-of-day and length performs the decoding and expanding as a function of the clock output.

In another specific embodiment the means for decoding and expanding the compressed code into channel, date, time-of-day and length further comprises means for converting the compressed code into a binary number, means for reordering the bits in the binary number to obtain a reordered binary compressed code, means for grouping the reordered binary compressed code into channel, date, time and length priority numbers, and means for using the channel, date, time and length priority numbers to derive the channel, date, time-of-day and length.

In yet another specific embodiment the means for enabling further comprises processor means for controlling the enabling of programs, a memory for authorized identification numbers coupled to the processor means, means coupled to the processor means for comparing the authorized identification numbers to an entered identification code, a memory for storing the program identifier of selected programs to be enabled coupled to the processor means, and means for determining a stored selected program identifier having a pre-determined relationship with a second output.

In yet another specific embodiment the means for determining further comprises a clock having date and time-of-day coupled to the second output.

In another specific embodiment the means for determining further comprises a program identifier coupled to the second output and retrieved from a signal from the television signal source.

In yet another specific embodiment the means for selecting programs to be enabled further comprises a remote controller, and means for receiving compressed codes via a telephone coupled to the remote controller.

In another specific embodiment the means for enabling further comprises means for frequency down-converting the television signal from the television signal source by a first frequency, means for filtering all but the channel for a selected program from the downconverted television signal coupled to the means for frequency down-converting, and means for frequency up-converting the downconverted and filtered television signal by the first frequency coupled to the means for filtering.

In another specific embodiment the means for frequency down-converting comprises a first mixer coupled to the television signal source, and a local oscillator coupled to the first mixer.

In yet another specific embodiment the means for filtering comprises a band-pass filter coupled to the first mixer.

In another specific embodiment the means for up-converting comprises a second mixer coupled to the band-pass filter and to the local oscillator.

In yet another specific embodiment the means for enabling programs further comprises a key lock coupled to the processor means for choosing between enabling only the selected programs for viewing and enabling all programs for viewing.

In another specific embodiment the apparatus further includes a first tamper proof connector for coupling the television signal source to the means for enabling programs.

In another specific embodiment the apparatus further includes a television receiver wherein the means for enabling is integral to the television receiver.

In another specific embodiment the apparatus further includes a fourth tamper proof connector for coupling the television signal source to the television receiver.

In another specific embodiment the apparatus further includes means for retrieving from a television signal an indication of a program scene to be concealed from viewing, and means for blocking the program scene from a television monitor whenever an indication of a program scene to be concealed from viewing is retrieved from a television signal.

In another specific embodiment the means for retrieving from a television signal an indication of a program scene to be concealed from viewing comprises a vertical blanking interval decoder.

In another specific embodiment the apparatus further includes means for blocking a plurality of program scenes from a television monitor whenever the indication of a program scene to be blocked from viewing is retrieved from a television signal.

In yet another specific embodiment the apparatus further includes a power splitter means for driving a plurality of cable box means and/or television receivers coupled between the output of the means for enabling and the plurality of cable box means and/or television receivers.

In another embodiment of the present invention a method is provided for controlling the viewing of programs, each program having a program identifier, on a television monitor from signals received by the television monitor from a cable box means for converting television signals from a television signal source, the method including the steps of entering a user identification code, verifying that the entered code is an authorized code, selecting one or more of the programs for which viewing on the television is to be controlled, entering program identifiers for the selected programs in storage, determining that one of the program identifiers has a predetermined relationship with an output, and upon the occurrence of the pre-determined relationship, filtering the selected program from the television signals received by the cable box means for converting television signals.

In another embodiment of the present invention a method is provided for controlling the viewing of programs, each program having a program identifier, on a television monitor from signals received by the television monitor from a cable box means for converting television signals from a television signal source, the method including the steps of entering a user identification code, verifying that the entered code is an authorized code selecting one or more of the programs for which viewing on the television is to be controlled, entering program identifiers for the selected programs in storage, determining that one of the program identifiers has a predetermined relationship with an output, and upon the occurrence of the pre-determined relationship, jamming the selected program from the television signals received by the cable box means for converting television signals.

In another embodiment of the present invention a method is provided for controlling the viewing of programs, each program having a program identifier, on a television monitor from signals received by the television monitor from a cable box means for converting television signals from a television signal source, the method including the steps of entering a user identification code, verifying that the entered code is an authorized code, selecting one or more of the programs for which viewing on the television is to be controlled, entering program identifiers for the selected programs in storage, determining that one of the program identifiers has a predetermined relationship with an output, and upon the occurrence of the pre-determined relationship, for the channel for the stored selected program, frequency down-converting by a first frequency the television signals to be sent to the cable box means, filtering the downconverted television signal retaining the channel corresponding to the selected program, and frequency up-converting the down-converted and filtered television signal by the first frequency, and sending the upconverted signal to the cable box means for converting television signals.

In a specific embodiment the step of selecting one or more of the programs for which viewing on the television is to be controlled is performed by use of compressed codes, each representative of, and compressed in length from, the combination of a channel, a date, a time-of-day, and a length for a program, and decoding each compressed code to obtain a channel, a date, a time-of-day, and a length for a program.

In another specific embodiment the method further includes the steps of retrieving from a television signal an indication of a program scene to be concealed from viewing, and blocking the program scene from a television monitor whenever an indication of a program scene to be concealed from viewing is retrieved from a television signal.

In another specific embodiment the step of retrieving from a television signal an indication of a program scene to be concealed from viewing further comprises the step of decoding a vertical blanking interval.

In another specific embodiment the step of selecting one or more of the programs for which viewing on the television is to be controlled further comprises the step of entering compressed codes, each representative of, and compressed in length from, the combination of a channel, a date, a time-of-day, and a length for a program on a remote controller.

In another specific embodiment the step of selecting one or more of the programs for which viewing on the television is to be controlled further comprises the step of receiving compressed codes, each representative of, and compressed in length from, the combination of a channel, a date, a time-of-day, and a length for a program via a telephone.

In another embodiment of the present invention an apparatus is provided for parental control of television viewing on a television receiver, the apparatus including means for controlling the enabling of programs, each having a program identifier, integral to the television receiver, means for decoding and expanding a compressed code, representative of, and compressed in length from, the combination of a channel, a date, a time-of-day, and a length for a program coupled to the means for controlling and integral to the television receiver, first means for frequency down-converting a television signal by a first frequency coupled to a television signal source and coupled to the means for controlling and integral to the television receiver, means for filtering all but the channel for a program to be enabled from the downconverted television signal coupled to the first means for frequency down-converting and integral to the television receiver, means for frequency up-converting the downconverted and filtered television signal by the first frequency coupled to the means for filtering and integral to the television receiver, means for converting the downconverted, filtered and upconverted television signal coupled to the means for frequency up-converting, second means for frequency down-converting the converted television signal by a second frequency coupled to the means for converting and integral to the television receiver, means for retrieving an indication of a program scene to be concealed from viewing coupled to second means for frequency down-converting an integral to the television receiver, and means for blocking the program scene from a television monitor integral to the television receiver whenever an indication of a program scene to be concealed from viewing is retrieved, coupled to the means for retrieving and integral to the television receiver.

In a specific embodiment the means for controlling the enabling of programs further comprises remote controller means for entering the compressed codes.

In another specific embodiment the means for controlling the enabling of programs further comprises means for receiving compressed codes via a telephone coupled to the remote controller.

In another specific embodiment the apparatus further includes a clock for providing an output as a function of time coupled to the means for decoding and expanding integral to the television receiver, and the means for decoding and expanding a compressed code into channel, date, time-of-day and length performs the decoding and expanding as a function of the clock output.

In yet another specific embodiment the means for controlling the enabling of programs further comprises processor means for controlling the enabling of programs, a memory for authorized identification numbers coupled to the processor means, means coupled to the processor means for comparing the authorized identification numbers to an entered identification code, a memory for storing the channels, dates, times and lengths of selected programs to be enabled coupled to the processor means, means for ordering the selected programs, having a channel, date, and time and length into temporal order coupled to the processor means, a clock with an output as a function of time coupled to the processor means, and means for comparing a stored selected program with a date and time that is earliest in time to the output of the clock for a pre-determined relationship.

In yet another specific embodiment the apparatus further includes a first tamper proof connector for coupling the television signal source to the television receiver, the first tamper proof connector coupled to the television receiver.

In another embodiment of the present invention a method of recording television programs on a video cassette recorder tape is provided including the step of recording within the television signal recorded on the tape an indication of an offensive scene to be subject to parental control, the indication of the offensive scene being recorded adjacent to the offensive scene on the video cassette recorder tape.

In a specific embodiment the method further includes the step of recording within the television signal recorded on the tape an indication of an offensive program to be subject to parental control, the indications of the offensive program being recorded continuously adjacent to the program on the video cassette recorder tape.

BRIEF DESCRIPTION OF THE DRAWINGS

The features of specific embodiments of the best mode contemplated of carrying out the invention are illustrated in the drawings, in which:

FIG. 6 is a flow graph of the compressed code decoding technique according to the present invention.

FIGS. 8–12 illustrate the different displays on the screen of the TV or the display of the VCR or remote controller employing the present invention.

FIG. 13 is a schematic showing the details of a parental control device having a tunable channel jammer according to the present invention.

FIG. 14 is a schematic of a jammer according to the present invention.

FIG. 17b is an illustration of the frequency spectrum at various locations in FIG. 17a.

DETAILED DESCRIPTION OF THE SPECIFIC EMBODIMENTS

Figure 1:
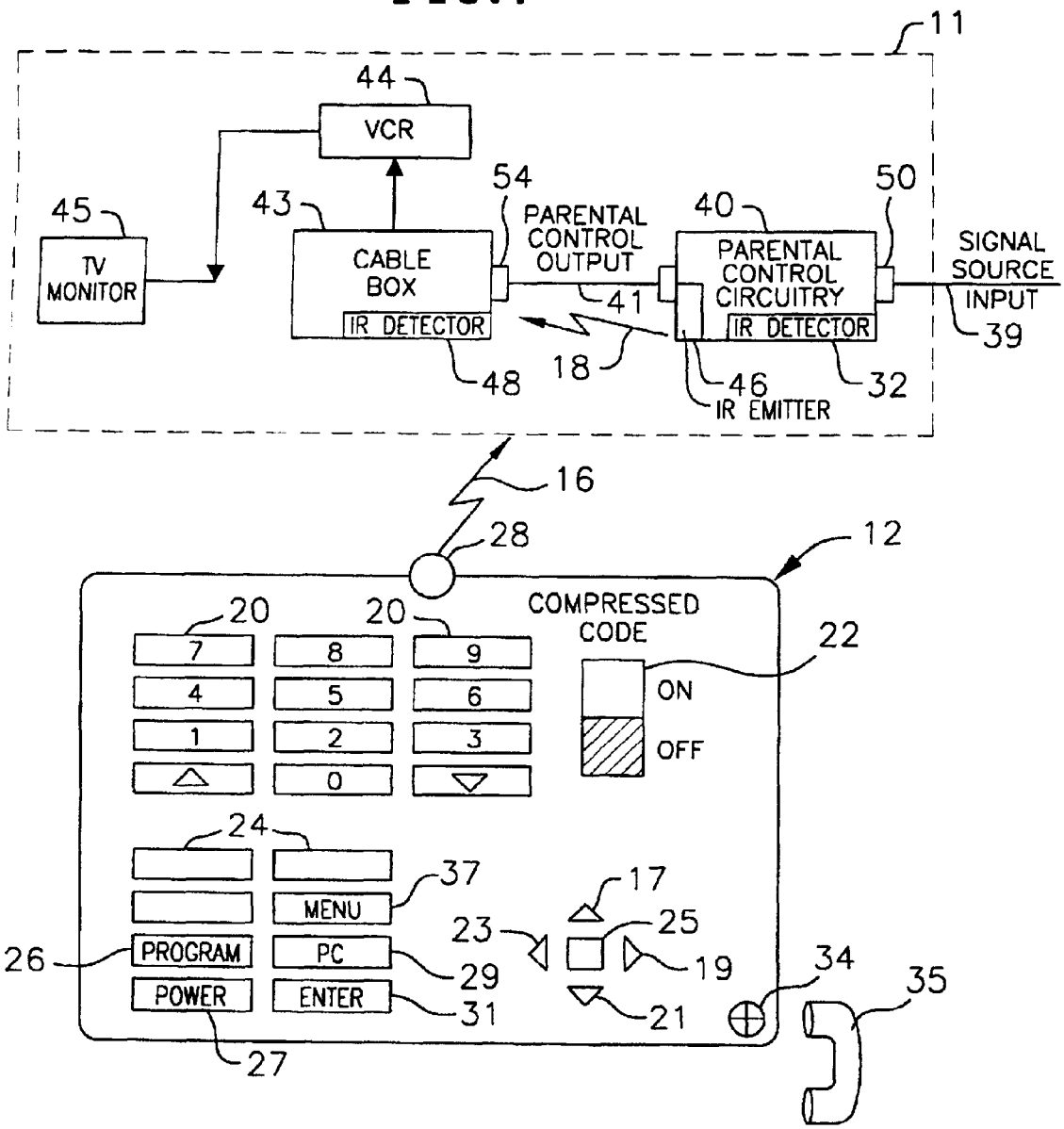
FIG. 1 is a schematic showing apparatus including a parental control device that receives the signal source input and blocks or enables programs and attaches to a cable box according to the present invention. A remote controller is included for controlling the parental control device.

Referring to the drawings, parental control circuity 40 is shown in FIG. 1 for providing parental control of the use of a television receiver. The parental control circuitry 40 is directly connected to the signal source input line 39 which is attached to parental control circuitry 40 through the tamper proof connector 50. The signal source input line 39 may be from one of many typical sources such as an antenna, television cable, or a satellite converter box. The signal source input line 39 is locked to the parental control circuitry 40 by the tamper proof connector 50 so that the parental control circuitry 40 may not be easily removed from the system and simply bypassed. The output of the parental control circuitry 40 is sent to cable box 43, which converts channels for use by the VCR 44 and the television monitor 45. The cable 41 between the parental control circuitry 40 and the cable box 43 may also have tamper proof connecters on either end, such as tamper proof connector 52 and tamper proof connector 54. The purpose of the parental control circuitry 40 is to allow parents to either enable selected programs for viewing, or to block selected programs. Locating the parental control circuitry 40 between the signal source input line 39 and the cable box 43 allows the enabling or blocking of programs that are purposely scrambled and intended to be unscrambled by the cable box 43. The parental control circuity 40 can be commanded via control keys on the parental control circuitry 40 (not shown) or the remote controller 12, which is further described below. To communicate with the remote controller 12, the parental control circuitry 40 has an infrared detector 32. The parental control circuitry 40 also has an infrared emitter 46 which can communicate with infrared detector 48 in the cable box 43. For example, if parental control circuitry 40 is tuned to a particular channel associated with a selected program, then the parental control circuitry 40 can communicate via infrared emitter 46 to switch cable box 43 to the same channel via infrared detector 48. The output of cable box 43 is typically channel 3 or channel 4, and the VCR 44 and the television monitor 45 are typically tuned to the output channel of the cable box 43.

Figure 2:
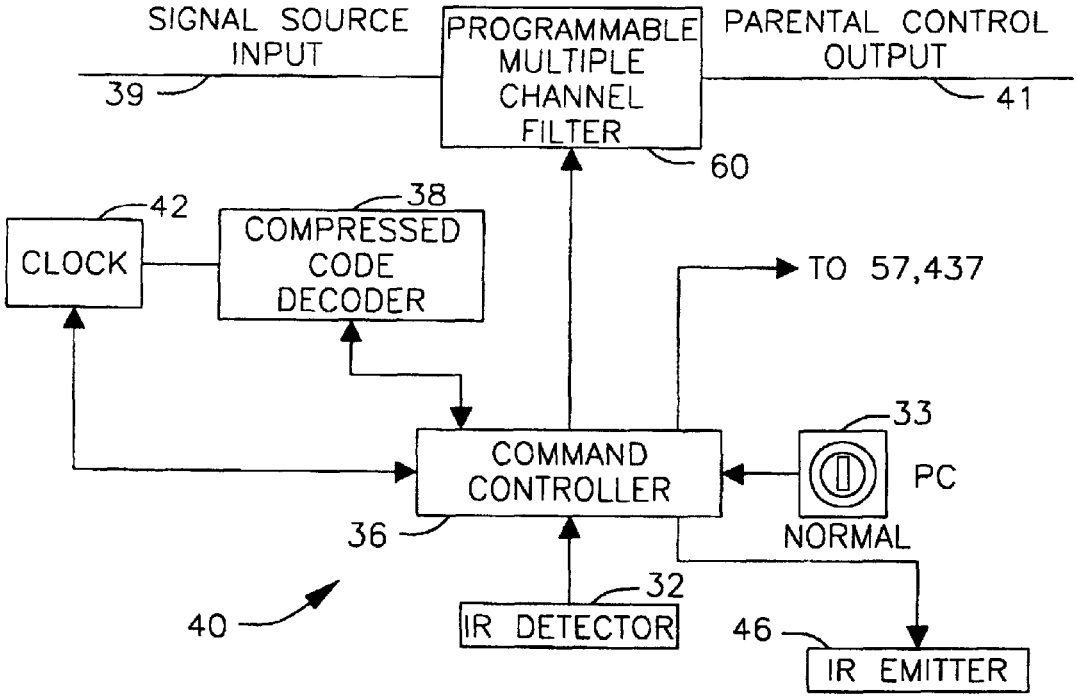
FIG. 2 is a schematic showing the details of a parental control device having a programmable multichannel filter according to the present invention.
Figure 18:
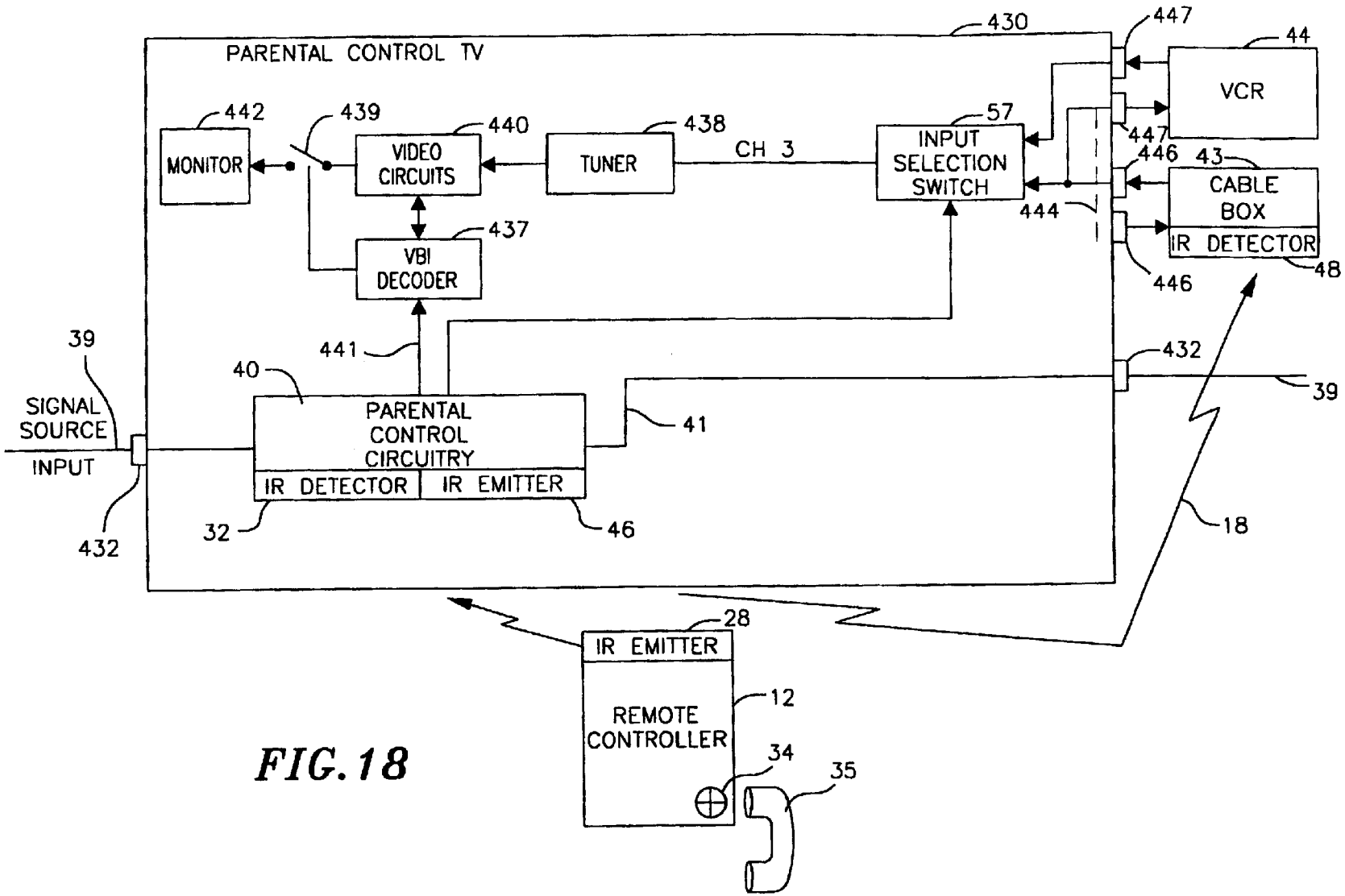
FIG. 18 is a schematic showing apparatus including a parental control device incorporated into a parental control television that receives the signal source input and blocks or enables programs according to the present invention. Compressed codes can be received via telephone and violent program scenes can be blocked according to the present invention.
Figure 19:
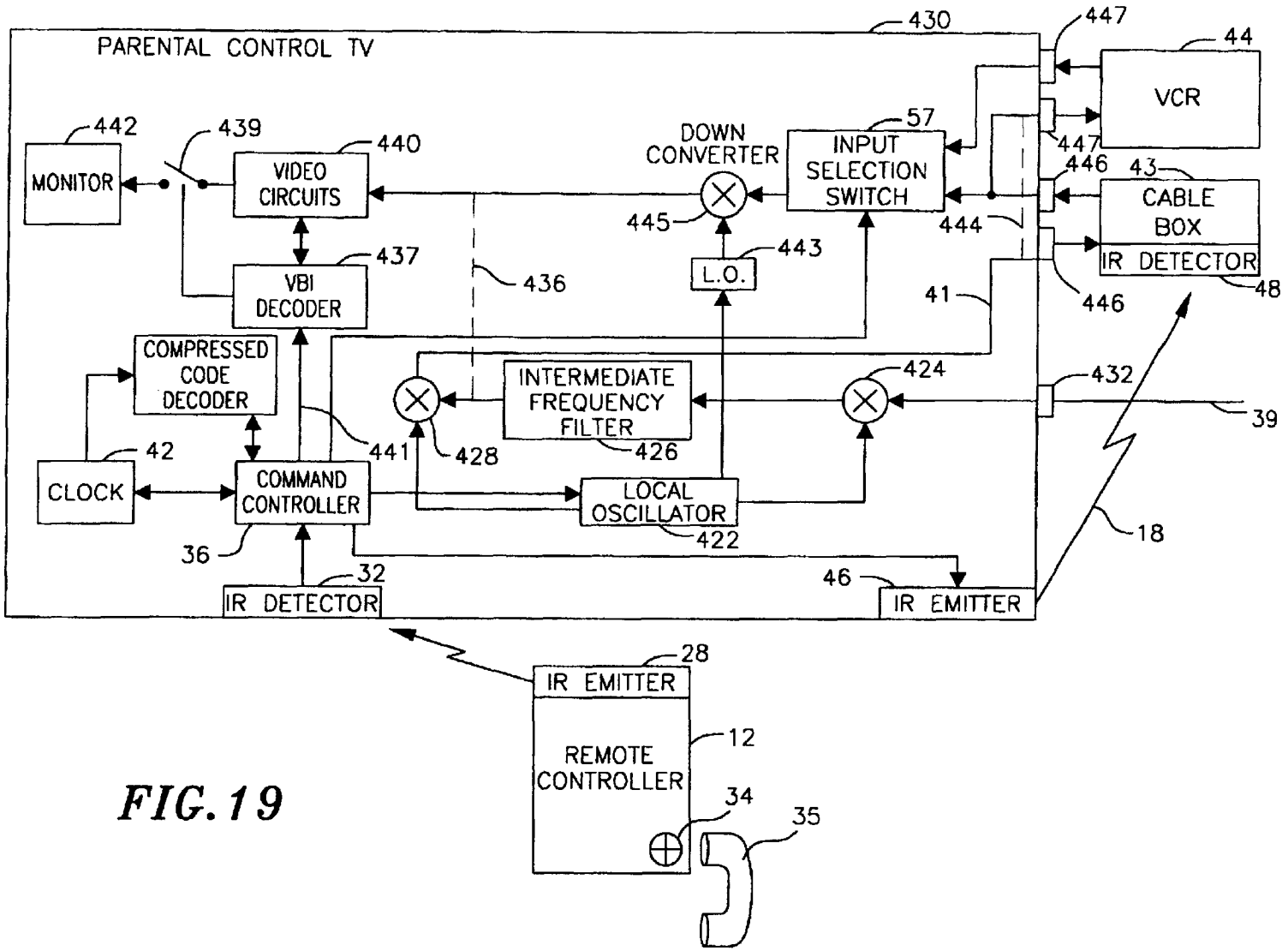
FIG. 19 is a schematic showing apparatus including a parental control device incorporated into a parental control television that receives the signal source input and selects channels for programs to be enabled according to the present invention. Compressed codes can be received via telephone and violent program scenes can be blocked according to the present invention.

FIG. 2 is a specific embodiment of parental control circuitry 40. In this embodiment, signal source input on line 39 is passed through programmable multiple channel filter 60 to form the parental control output on line 41. Programmable multiple channel filter 60 is controlled by command controller 36. The command controller 36 receives commands from infrared detector 32 and outputs commands to cable box 43 via infrared emitter 46. Command controller 36 is coupled to/from the clock 42 and the compressed code decoder 38, which also has an input from the clock 42. The clock 42 in parental control circuitry 40 can be synchronized with a clock in VCR 44 and any other clocks in the parental control system 11 by downloading time encoded as audio tones from telephone 35 to microphone 34 and remote controller 12, which can then send the time to the various clocks in the system to synchronize them. The command controller also receives an input from key switch 33, which has a parental control (PC) position and a normal position. The key for key switch 33 should be kept by the parent in a secure place. If the key switch is in the normal position then any program can be watched. If the key is in the PC position, then only programs that are enabled can be watched. Outputs from command controller 36 include input selection switch 57 and vertical blanking interval decoder 437, as shown in FIGS. 18 and 19.

Figure 5:
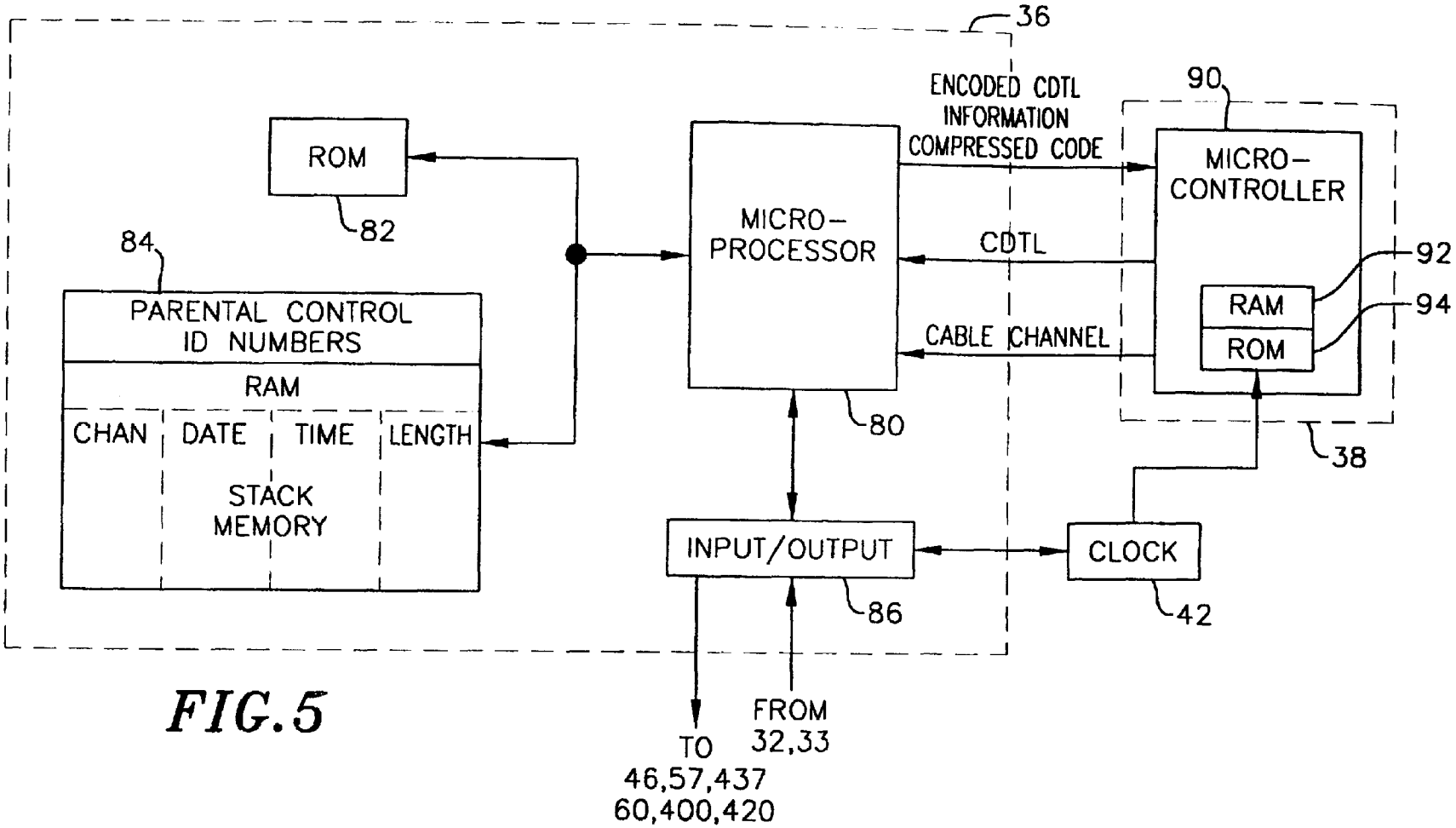
FIG. 5 is a schematic of a processor for implementing the command controller and compressed code decoder according to the present invention.

The command controller 36 and compressed code decoder 38 can be implemented as shown in FIG. 5 and are described in further detail below. However, before the details of FIG. 5 are described, the programmable multiple channel filter 60 of FIG. 2 and its operation are described.

Figure 3:
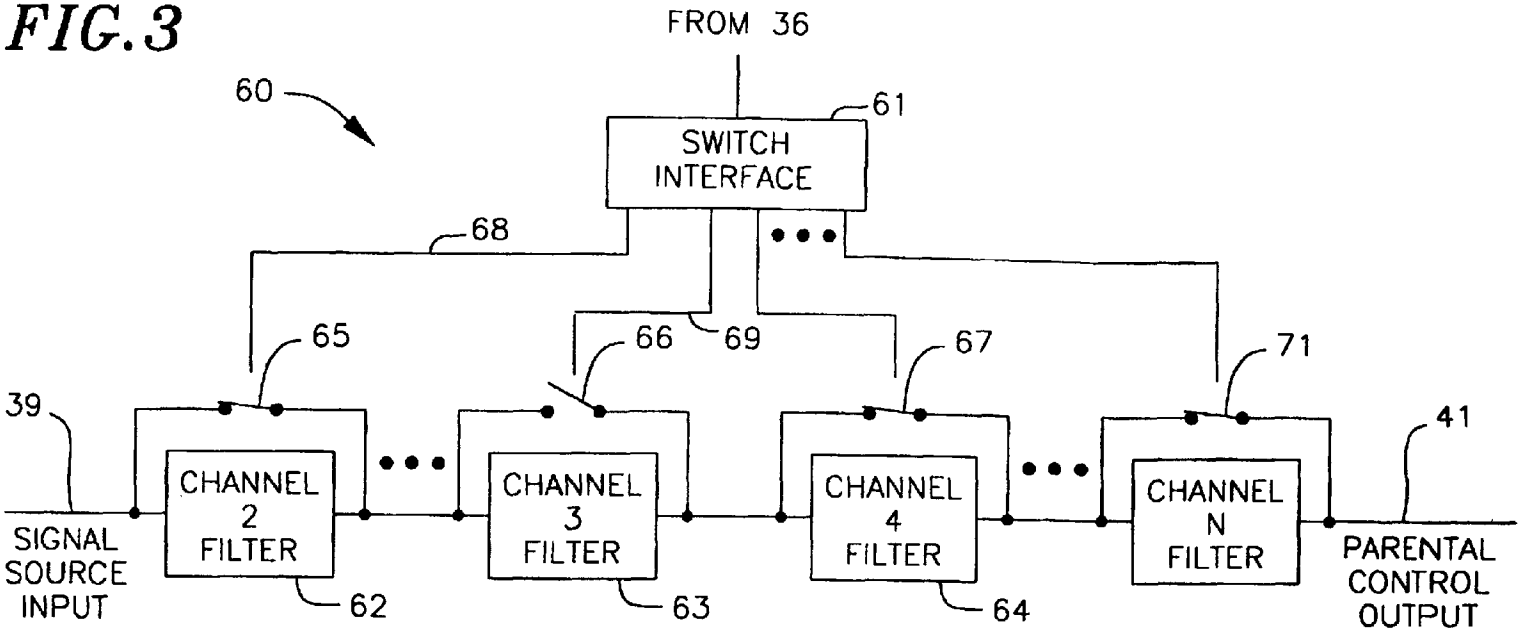
FIG. 3 is a schematic showing a programmable multiple channel filter according to the present invention.

The programmable multiple channel filter 60 can be implemented as shown in FIG. 3. Suppose a user has specified a number of programs to be blocked from viewing on the television 45. The user can specify which programs to block by either specifying particular programs to be blocked, or by specifying that all programs on a particular channel be blocked. FIG. 3 shows a programmable multiple channel filter 60 which can filter multiple channels from the broad band television signal input 39. For example, in FIG. 3, switch 66 is shown as open which indicates that the channel 3 filter 63 will filter channel 3 from the parental control output 41. On the other hand, switch 65 and switch 67 are closed allowing the broad band television signal input 39 to bypass channel 2 filter 62 and channel 4 filter 64. Thus, channels 2 and 4 are not filtered from the parental control output 41. Switches 65–71 are controlled by switch interface 61 which is in turn controlled by command controller 36. If a particular program is to be blocked from viewing, then the command controller 36 would open the appropriate switch, for example, switch 66 for channel 3, at the start of the program and close the switch 66 at the end of the program. This would block the viewing of that particular program on channel 3. To perform this function, the command controller needs to know the channel, date, time-of-day and length (CDTL) of the program to be blocked from viewing. This CDTL information can be either input as channel, date, time-of-day and length to the parental control circuitry 40 or can be entered via compressed codes, which are described below, via remote controller 12.

Another method of determining when to block a program is to look for a program identifier in the signal received from the television signal source. If the received program identifier matches the program identifier of a program to be blocked, then the program is blocked. An example of this method is called VPS, which is a program identification transmitted with the television signal in European broadcasting systems. This technique can also be used to enable programs.

Figure 4:
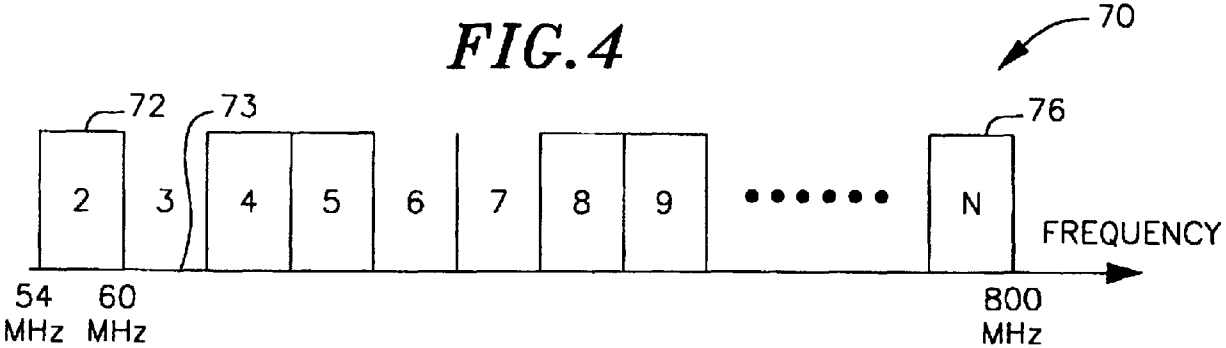
FIG. 4 is an illustration of a frequency spectrum showing channels being blocked according to the present invention.

FIG. 4 shows an example frequency spectrum for a broad band television signal that has been filtered by programmable multiple channel filter 60. In FIG. 4 channels 3, 6, and 7 have been filtered so that programs in those channels cannot be viewed. Because it is possible with the programmable multiple channel filter 60 to either block the viewing of an entire channel or a particular program, the frequency spectrum of the parental control output 41 will change over time as the command controller 36 sends commands for turning on and off the switches 65–71 to the switch interface 61.

The remote controller 12, shown in FIG. 1 has a number of keys, which include numerical keys 20, compressed code switch 22, function keys 24, program key 26, and power key 27. The remote controller 12 also includes a total parental control key 29 and an enter key 31. The remote controller may further advantageously include a cursor control having up/down keys 17 and 21, respectively, right/left keys 19 and 23, respectively, and an activate key 25. There are means in the remote controller 12 that interpret each key as it is pressed, and send the proper command signal 16 to the parental control circuity 40 via the infrared diode 28. Except for the compressed code switch 22, the total parental control key 29, menu key 37, enter key 31 and the up/down 17/21, right/left 19/23 and activate 25 keys, the remote controller is essentially the same as any other remote controller in function. It is to be noted that the typical keys of remote controllers, such as volume control and channel selection, are not shown on the controller of FIG. 1, but would ordinarily be present.

The total parental control key 29 and enter key 31 are used when selecting programs that are to be blocked or enabled for viewing on the television. The enter key 31 is used when entering the user's identification code that permits programming of the parental control circuitry to set up the programs to be blocked or enabled for viewing on the television receiver.

The compressed code switch 22 is provided to allow the user to lock the remote controller 12 in the compressed code mode while using a compressed code, which is encoded CDTL information. The compressed codes allow easy selection of a program to be enabled or blocked under parental control.

The remote controller 12 also can have a microphone 34, which can be used together with telephone 35, to download encoded CDTL information or compressed codes. The compressed codes for programs that are to be enabled for viewing or blocked from viewing are entered via audio tones from telephone 35. In one embodiment, the compressed codes or program identifiers from a preselected list of violent programs are downloaded via telephone from a central data base. The parent calls the data base and then holds the television receiver 35, near the remote controller microphone 34. The received compressed codes are then communicated from the remote controller 12 to command controller 36.

A possible realization of the command controller 36 and the compressed code decoder 38 is shown in FIG. 5. The command controller 36 includes a microprocessor 80 for overall control and for performing the parental control functions, a read only memory 82 for program storage, a random access memory (RAM) 84, and input/output circuitry 86. This input/output circuitry 86 is adapted to receive commands from the infrared detector 32 and the key switch 33. The input/output has output interfaces to infrared emitter 46, input selection switch 57 and vertical blanking interval decoder 437, the latter two of which are shown in FIGS. 18 and 19. The input/output circuitry 86 has a bidirectional interface to clock 42. Commands are sent from command controller 36 via input/output 86 to the programmable multiple channel filter 60, shown in FIG. 2, the tunable channel jammer 400, shown in FIG. 13, and the tunable channel selector 420, shown in FIG. 16. The random access memory 84 includes a section for the parental control identification code and a section of stack memory for storing the channels, dates, times-of-day, and lengths for programs selected to be enabled for viewing or, alternatively in the case of exclusion, the channels, dates, times-of-day, and lengths for programs selected to be blocked from viewing. Either the ID number section, or the stack memory may be separate from RAM 84. As noted above, the compressed code, which are encoded CDTL information, may be advantageously used to simplify the parental control operation of the television.

One implementation of the compressed code decoder 38 is shown in FIG. 5. A microcontroller 90 with a random access memory 92 and a read only memory 94 has interfaces to microprocessor 80. The encoded CDTL is sent to microcontroller 90, which decodes the compressed code and returns CDTL information to microprocessor 80.

In order for the compressed code to be useful, it must be decoded, and apparatus for that purpose must be provided. A compressed code decoder 38 is included in the parental control circuitry 40 of FIG. 1 and is further shown in FIGS. 2, 13, 16 and 19. If the command controller 36 determines that a compressed code has been received, then the compressed code will be sent to the compressed code decoder 38 for decoding. The compressed code decoder 38 converts the compressed code into channel, date, time and length (CDTL) information which is stored in RAM 84 and used by the command controller 36 to control the enabling and clocking of particular programs. The decoding of the compressed code into CDTL is set forth in the flow chart of FIG. 6. As shown in FIG. 6, the compressed code decoding can be a function of the output of clock 42. The compressed code encoding and decoding are described in continuation in part application Ser. No. 07/829,412, filed Feb. 3, 1992, which is incorporated herein by this reference as though set forth in full.

The clock 42 is also used for the timing of the operation of the command controller 36. When the proper date and time-of-day is read from clock 42, then the command controller 36 controls the parental control circuitry 40 to block or enable programs going to the cable box 43.

Figure 7:
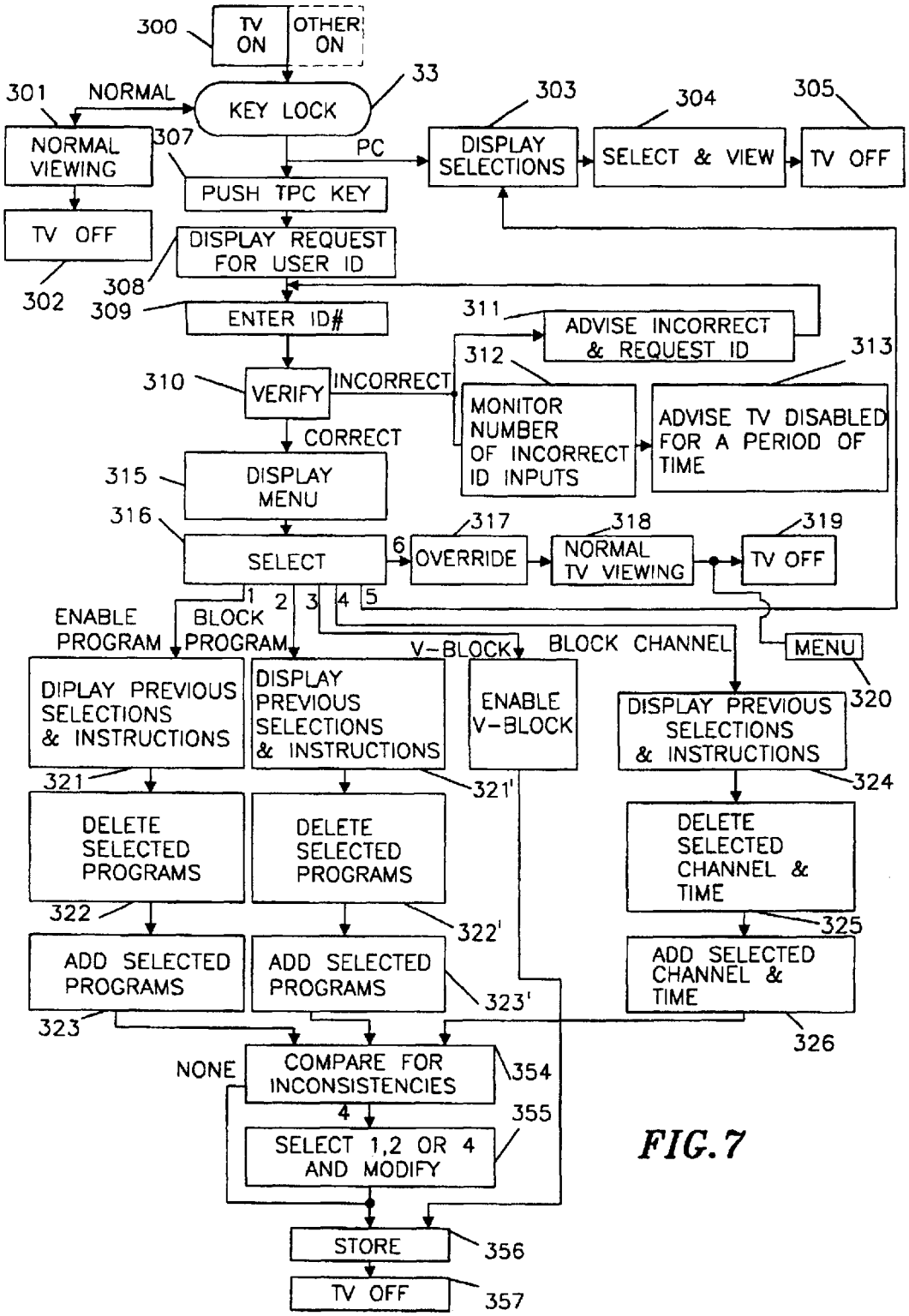
FIG. 7 is a flow-chart of the operation of the apparatus incorporating the parental control device in accordance with the present invention.

The operation of the parental control device 40 of FIG. 1 may be better understood by reference to the flow chart set forth in FIG. 7. The TV is turned on at step 300, and any other ancillary apparatus, such as parental control circuitry 40 in FIG. 1, is also turned on. If the key lock 33 is in the position for normal TV viewing, then the normal viewing of step 301 will be available. After completion of viewing, the TV is shut off (step 302). If the key lock 33 is in the parental control position, then upon turning on the TV, the selections that are enabled or blocked for viewing will be displayed on the screen as shown in step 303. A representative display of programs to be enabled in step 303 is shown in FIG. 8. A similar display is used to display blocked programs. The user of the apparatus may then select one of the programs that is enabled for viewing in step 304 and, upon completion of viewing, the TV is then shut off in step 305. If the programs to be blocked or enabled are to be modified, then the total parental control key, such as key 29 in FIG. 1, is pushed in step 307.

The pushing of the total parental control key 29 will cause a message to appear on the screen of the TV such as the one shown in FIG. 9 wherein the user is requested to enter his or her identification (ID) code or number. Following the display of the message in step 308, the user enters his or her ID in step 309 by using the numbers of the key pad 20, for example, as shown in the remote controller of FIG. 1. The authorized user ID codes will have been previously stored in the parental control ID section of the RAM 84, as illustrated in FIG. 3. A typical user ID might be 6823 which, when entered, is compared in the verify step 310 under the control of the microprocessor 80 with the authorized parental control IDs stored in the RAM 84. The ID code number is entered by pressing keys numbered 6, 8, 2 and 3 and then the enter key 31. If the ID number that is entered is not an authorized number stored in RAM 84, then the user will be advised in step 311 by a message, such as the message of FIG. 10, displayed on the TV screen that the ID number is incorrect and the entry of another ID number will be requested. Steps 309 and 310 will, again, take place upon the entry of the new ID number and, if this ID number is again incorrect, the user will again be advised in step 311. Upon the entry of a number of incorrect ID numbers, such as 3, which are monitored in step 312, then the user will be advised in step 313 by a message such as the one shown in FIG. 11 that the ID numbers that have been entered are not authorized ID numbers and that the TV will be disabled for a period of time. The period of time may, for example, be 30 minutes or one hour or whatever may be selected during set up by the authorized user of the equipment.

If in the verification step 310 the user ID code that has been entered is an authorized ID, then in step 315 a menu will be displayed on the TV screen, such as shown in FIG. 12. The menu displayed in step 315 as shown in FIG. 12 has choices for enabling programs, blocking programs, and enabling V-block, which is a choice that allows the blocking of scenes in programs or entire programs that have objectionable violence, nudity, or language. One or more of the possible selections set forth in the menu of FIG. 12 may be selected in step 316. The user may also select entry 6 on the menu to override the parental control operation by pushing number 6 on, for example, the remote controller 12 of FIG. 1, for normal TV viewing. This will cause the override of step 317 to permit normal TV viewing (step 318) after which the TV will be shut off in step 319 or the menu of FIG. 12 may again be displayed in step 320 by pushing the MENU key 37 shown in FIG. 1.

With the menu displayed on the screen of the television in step 315 or 320, the user need only push one of the numbered keys on key pad 20 to set up the mode for selecting one of the possible selections as shown in the menu of FIG. 12. The pushing of button 1 will permit the selection of programs to be enabled, as illustrated in FIG. 8. Upon pushing button key 1, for example, (step 321), the previous selections that have been made will be displayed along with instructions for making deletions or additional selections.

If programs are to be deleted in step 322, the user activates the cursor by pressing button 25 (FIG. 1), and then moves the cursor on the TV screen displaying the available programs, e.g., as shown in FIG. 8, by use of the up/down keys 17 and 21 and the right/left keys 19 and 23 to the program that is to be deleted. With the cursor highlighting the program to be deleted, the enter key 31 is depressed to complete the deletion of the program from programs that may be viewed. In step 322, programs may, alternatively, be deleted by entering a compressed code for a program, as shown in FIG. 8. For example, if it is desired to delete the program FAMILY TIES, it is only necessary to enter on the keypad 20 the numbers "1-5-6-5-7" and thereafter press the ENTER key 31. This will complete the deletion of FAMILY TIES from the programs available for viewing.

Similarly, to add one or more programs for viewing in step 323, the compressed codes that appear with the programs listed in the printed TV schedules may advantageously be employed. The user, on deciding which of the programs listed in the TV schedule to make available for viewing, enters the compressed code for each of these programs by using the keypad 20 on the apparatus or on the remote controller, as shown in FIG. 1, and the enter key 31. The TV schedule may also be made available on a floppy disk, as disclosed in U.S. patent application Ser. No. 07/882,291 filed May 13, 1992 and incorporated herein by this reference as though set forth in full. A floppy disk drive may be incorporated into the parental control circuitry, the VCR, or the television for reading the TV schedule and displaying same on the screen of the TV. If a floppy disk is used, then programs to be added may be selected by use of the cursor keys shown in FIG. 1 or by entry of the compressed code that is listed in the TV schedule retrieved from the floppy disk. Additionally, the TV schedule may be available as part of the TV broadcast signal in the vertical blanking interval of the TV signal or as the video program. When the vertical blanking interval is used to carry the TV scheduling information, the schedule information may be retrieved from the TV broadcast signal by a vertical blanking interval decoder 437, as shown in FIGS. 18 and 19 and displayed on the TV monitor 442 of FIGS. 18 and 19, for example. Again, the programs to be added may be selected by use of the cursor keys as shown in FIG. 1, or by entry of the compressed code as described above.

The user may also select programs to be blocked from viewing on the TV by pushing button 2 when the menu is being displayed on the TV screen in step 315. Steps 321', 322', and 323' operate in an analogous manner to steps 321, 322, and 323.

The V-block mode may be selected by pushing button 3 when the menu is being displayed on the TV screen in step 316. The V-block mode enables the automatic blocking of programs or scenes in programs that have objectionable violence, nudity, or language. The V-block operation is described further below.

During the selection process, each selection to be added is stored in RAM 84 and at the completion of the selection process transferred to the stack memory portions of RAM 84 for storage in temporal order. Upon the completion of each selection from the menu, the menu key 37 is depressed to return to step 315 for display of the menu shown in FIG. 12. At any time in the selection process, the key 7 may be depressed while the menu is being displayed to compare the selections that have been made for possible inconsistencies, which is done in step 354. For example, if programs have been both enabled and blocked this will be noted as an inconsistency. If there are no inconsistencies, then the microprocessor 80 causes the selections to be stored in step 356 in the stack memory portion of the RAM 84. If inconsistencies do exist in step 354, then the program, channel, date, or time that is to be deleted to avoid the inconsistency is selected in step 355 by depressing the appropriate key 1, 2 or 4 and going through the delete step 322 or 322'. Once there are no inconsistencies in the selections and the selections are stored in the stack memory portion of RAM 84, then the TV is shut off in step 357.

Another specific embodiment of the parental control circuitry 40 is shown in FIG. 13. Most of the elements of FIG. 13 are the same as those shown in FIG. 2 so an explanation of those will not be repeated. However, a key difference is tunable channel jammer 400 which is imposed between signal source input line 39 and parental control output line 41. The purpose of tunable channel jammer 400 is to block the viewing of particular channels, or programs. Implementing the programmable multiple channel filter of FIG. 3 might be fairly expensive, because each channel filter would have to be fairly precise in order to not interfere with adjacent channels and the number of components involved would result in a high cost. Rather than filtering a channel as in FIG. 3, tunable channel jammer 400 instead has the purpose of jamming a channel or multiple channels. If a channel is selected to be blocked from viewing, then the jamming on that channel can be continuous. If particular programs have been Selected to be blocked from viewing, then the respective channels for those programs will be jammed on mat date starting with the time of day for that program and end after the program has ended. The start and end time for the programs can be attained from the CDTL information in the G codes.

FIG. 14 shows an apparatus for implementing tunable channel jammer 400. One implementation, a narrow band noise source 402 is mixed with a tunable frequency generator 404 in mixer 406 and then combined with signal source input line 39 in combiner 408 to produce the parental control output on line 41. The tunable frequency generator 404 would be tuned to place the narrow band noise inside the channel to be jammed. Multiple channels can be jammed by time sharing the circuity, of FIG. 14. For example, if channels, 2, 3, 5, and 10 are to be jammed at the same time then the tunable frequency generator 404 would be tuned to each of those channels for a set period of time and then would skip to the next channel to be jammed and so on. If the duty cycle of the jamming on any particular channel is high enough, then the channel will be unwatchable. By time sharing the apparatus in this manner considerable costs can be saved.

Figure 15:
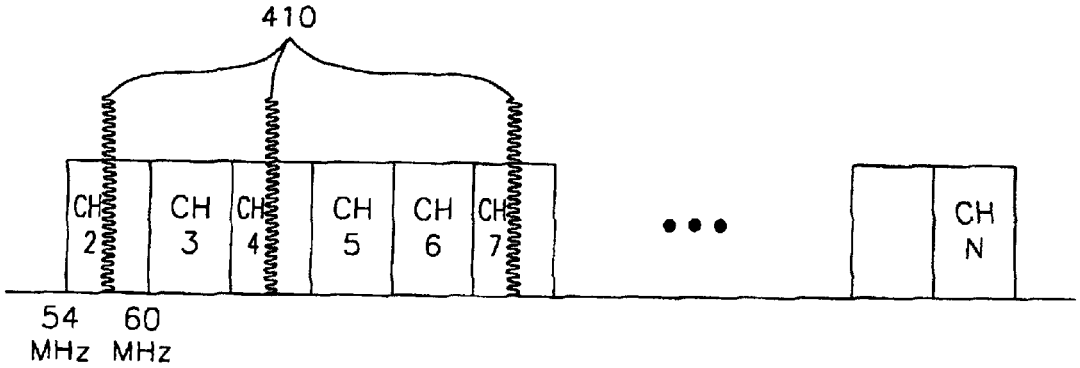
FIG. 15 is an illustration of a frequency spectrum showing channels being jammed according to the present invention.

In another implementation, instead of having a narrow band noise source 402, a low frequency generator 402 is supplied. Again, tunable frequency generator 404 is used to place the low frequency within the channel to be jammed. Tests have shown that a noise generator with a 1 kilohertz bandwidth centered at 55 megahertz was sufficient to block the viewing of channel 2. It should be possible to time share the circuity of FIG. 14 between as many as 10 channels at a time which would result in a 10 percent jamming duty cycle on any particular channel. FIG. 15 is an illustration of a frequency spectrum showing jamming occurring in channels 2, 4, and 7.

Figure 16:
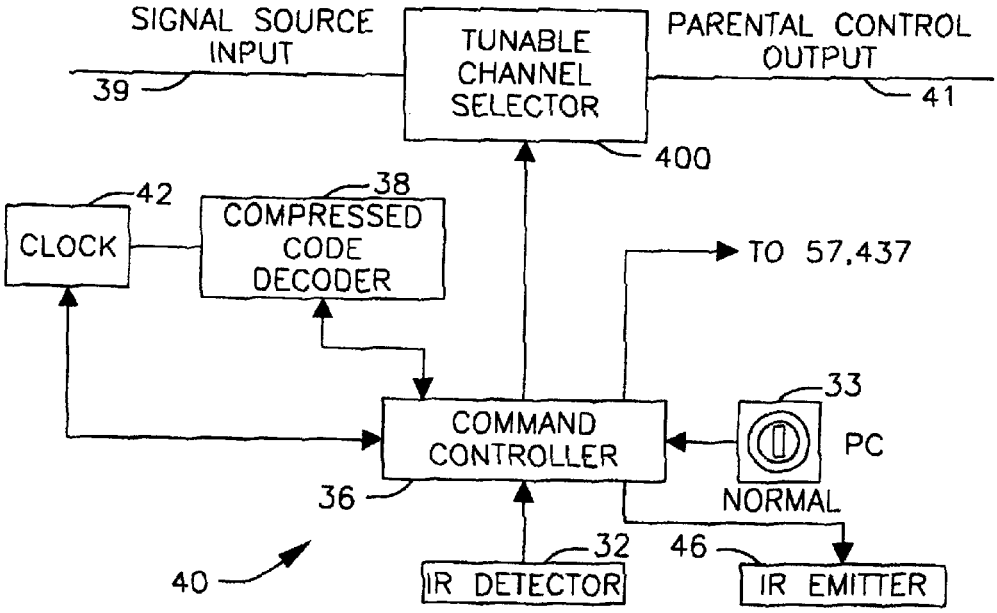
FIG. 16 is a schematic showing the details of a parental control device having a tunable channel selector according to the present invention.

The programmable multiple channel filter 60 of FIG. 2 and the tunable channel jammer 400 of FIG. 13 both have the purpose of blocking a channel or a program from viewing by a user of a television. FIG. 16 is a specific implementation of parental control circuitry 40 which allows particular channels or programs to be enabled for viewing on a television. Again, most of the elements of FIG. 16 are similar to those in FIG. 2, however, tunable channel selector 420 is different and has the purpose of enabling certain channels or programs for viewing.

Figure 17A:
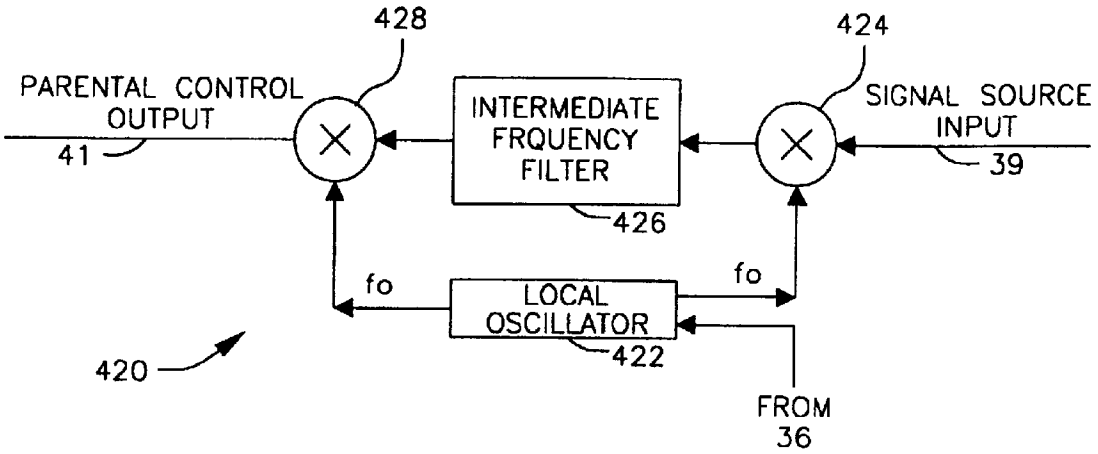
FIG. 17a is a schematic of a tunable channel selector according to the present invention.

FIG. 17a shows an implementation of tunable channel selector 420. In FIG. 17a, the signal on signal source input line 39 is frequency down converted by mixing this signal with the output of tunable local oscillator 422 in frequency down-converter 424. The output of frequency down-converter 424 is then filtered by intermediate frequency filter 426 to pass only the channel to be enabled for viewing. This channel is then frequency up converted by frequency up-converter 428, which mixes the output of intermediate frequency filter 426 with the output of tunable local oscillator 422. The amount of frequency down conversion in frequency down-converter 424 is equal to the amount of frequency up conversion in frequency up-converter 428. The tunable local oscillator 422 is the same for frequency down-converter 424 and frequency up-converter 428.

Figure 17B:
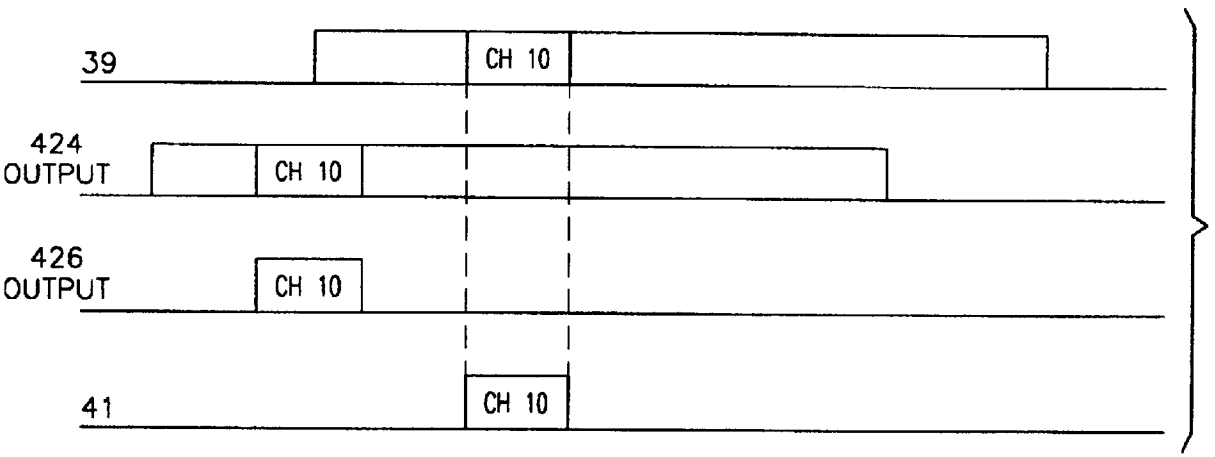

FIG. 17b illustrates the frequency spectrum at signal source input line 39, the frequency down-converter 424 output, the intermediate frequency filter 426 output, and the output on parental control output line 41 of FIG. 17a. As shown in FIG. 17b, the result is that on parental control output line 41 only the selected channel is remaining which is channel 10 in FIG. 17b. Since at any one time only one channel is enabled for viewing, the command controller 36 must command the cable box 43 to tune itself to the proper channel. This is done by communicating through infrared emitter 46 to infrared detector 48 on cable box 43.

A parental control television 430 is shown in FIG. 18. The parental control television 430 has parental control circuitry 40 incorporated into it. The parental control circuitry 40 inside the parental control television 430 can be implemented as previously discussed to either block certain programs and channels from viewing or enable certain programs and channels for viewing. By incorporating the parental control circuitry 40 inside the parental control television 430, the extra cost and inconvenience of a separate unit is avoided. The signal source input line 39 is connected to the parental control television 430 by a tamper proof connector 432 to prevent tampering. The cable box 43 and VCR 44 can be located outside of the parental control television 430. The parental control output on line 41 can be sent directly to the cable box 43, or can bypass the cable box 43 via line 444. The input selection switch 57 within the parental control television 430 selects either an input from VCR 44 or cable box 43 for viewing on television monitor 442. In this implementation, a normal tuner 438 and video circuits 440 are provided.

Figure 20:
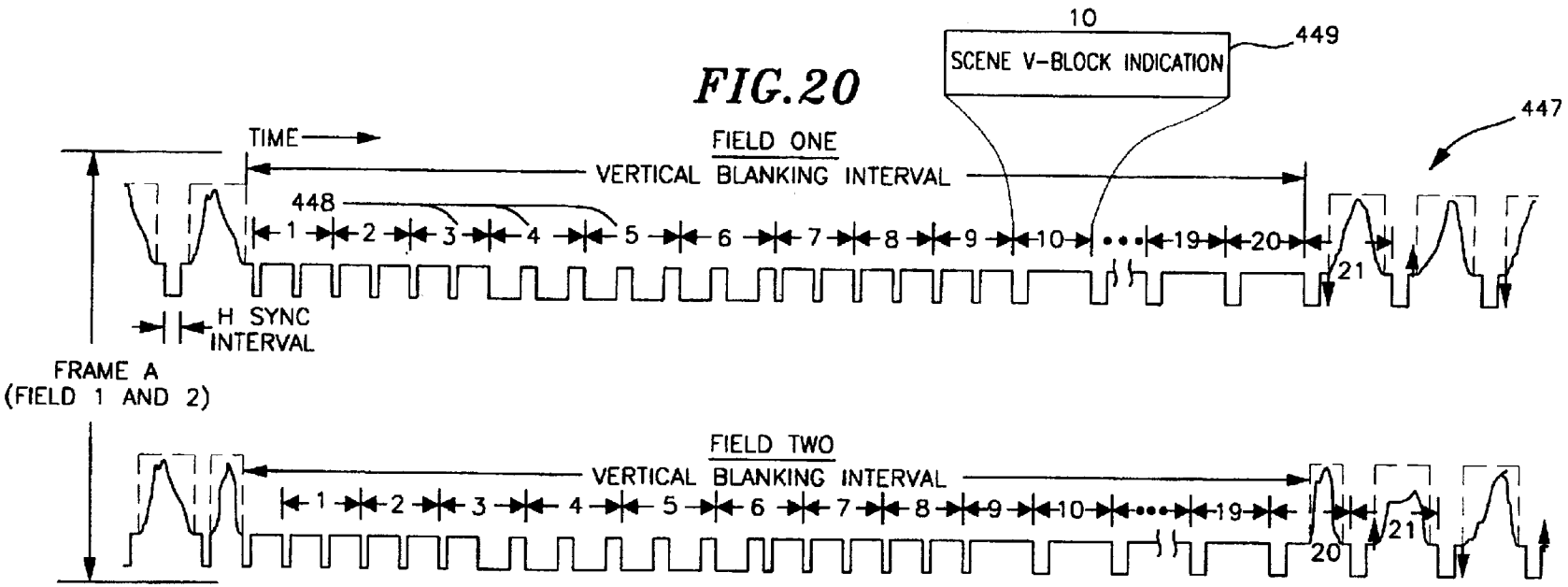
FIG. 20 is a diagram illustrating the timing of the vertical blanking interval lines of an interlaced television scanning raster.

Another capability that can be provided within the parental control television 430 is the feature previously referred to as "V-Block," which allows the blocking of programs or scenes in programs that have objectional violence, nudity or language. V-block is implemented by decoding the vertical blanking interval of a television raster scan. FIG. 20 is a diagram illustrating the timing 447 of the vertical blanking lines 1–20 of field 1 and vertical blanking lines 263–283 of field 2 of a video frame. As shown, each vertical blanking interval line 448 occupies a portion of the time span. A scene V-Block indication 449 can be put into one of the vertical blanking intervals lines. The vertical blanking lines would then be decoded by vertical blanking interval decoder 437. If vertical blanking interval decoder 437 detects a scene V-block indication 449 in the vertical blanking interval lines, and if the V-block mode has been enabled by parental control circuitry 40 via line 441, then the vertical blanking interval decoder 437 will open the V-block switch 439. This will block the offending scene from the television monitor 442. After the offending scene is finished, the vertical blanking internal decoder 437 would detect the absence of scene V-block indication 449 in the vertical blanking lines and close the V-Block switch 439, which reconnects the television monitor 442 to the video circuits 440. If all the scenes in a program have scene V-block indications, then the entire program is blocked.

The V-Block feature will also operate to block offending scenes from any programs played on the VCR which have a scene V-Block indication in the vertical blanking interval. This provides parental control for programs that are recorded with a scene V-block indication.

The V-block feature described for FIG. 18 can also be incorporated into the parental control circuitry 40 of FIG. 1, as indicated in the discussion of FIG. 12 above, and as shown in FIG. 7.

A specific embodiment of a parental control TV 430 is shown in FIG. 19. Again, the signal source input line 39 is attached to parental control television 430 through a tamper proof connector 432. The broad band signal on line 39 is shifted in frequency by frequency down-converter 424 and then band-pass filtered by intermediate frequency filter 426 and then up-converted in frequency by frequency upconverter 428. The frequency down-conversion in frequency down-converter 424 and the frequency up-conversion in frequency upconverter 428 are the same and determined by the setting of tunable local oscillator 422. The frequency shifting and filtering operation is the same as described for FIGS. 17a and 17b. The local oscillator 422 is controlled by command controller 36 and is tuned to select only enabled programs for viewing. As shown FIG. 19, command controller 36 is coupled to G-code decoder 38 and clock 42 as well as infrared detector 32 and infrared emitter 46. Command controller 36 and G-code decoder 38 can be implemented as shown in FIG. 5. The output of frequency upconverter 428 is sent to cable box 43 which is attached parental control television 430 via tamper proof connectors 446. The cable box 43 must be tuned to the same channel that is selected by command controller 36. This is accomplished by command controller 36 sending via infrared emitter 46 and infrared detector 48 a command to the cable box 43 to switch to the channel that has been selected. The cable box 43 converts the cable channel and performs an unscrambling of any scrambled channels and then outputs onto channel 3 the selected program. A VCR 44 can also be connected to a parental control television 430 via connectors 447. The selection between VCR 44 or cable box 43 is performed by input selection switch 57 which is controlled by command controller 36. The output of input selection switch 57 is sent to frequency down-converter 445 which downshifts the television signal for input to the video circuits 440. In FIG. 19, line 444 indicates that it is possible to send the output of frequency upconverter 428 directly to the VCR 44. This would be useful if cable channels did not need to be descrambled by cable box 43.

Also shown in FIG. 19 is line 436 from intermediate frequency filter 426 to video circuits 440. In a normal television, the intermediate frequency filter 426 output is sent to the video circuits 440 directly. In the case of parental control television 430, the output of intermediate frequency filter 426 is frequency upshifted by frequency upconverter 428 and the television signal from the cable box 43 or the VCR 44 must be downshifted by frequency downconverter 445 in order to be at the correct frequency for the video circuits 440. The amount of frequency shift in frequency downconverter 445 is not the same as the amount of frequency shift related to tunable local oscillator 422. However, another local oscillator 443 is provided which can be coupled if desired, to tunable local oscillator 422.

The V-block feature described for FIG. 18 is also incorporated into the parental control television 430 of FIG. 19.

The programs to be enabled for viewing can be selected via remote controller 12 and are communicated from remote controller 12 via infrared emitter 28 to infrared detector 32. The remote controller 12 can also have a microphone 34, which can be used together with telephone 35, to download encoded CDTL information (compressed codes) or program identifiers. The compressed codes for programs that are to be enabled for viewing or blocked for viewing are entered via audio tones from telephone 35.

Figure 21:
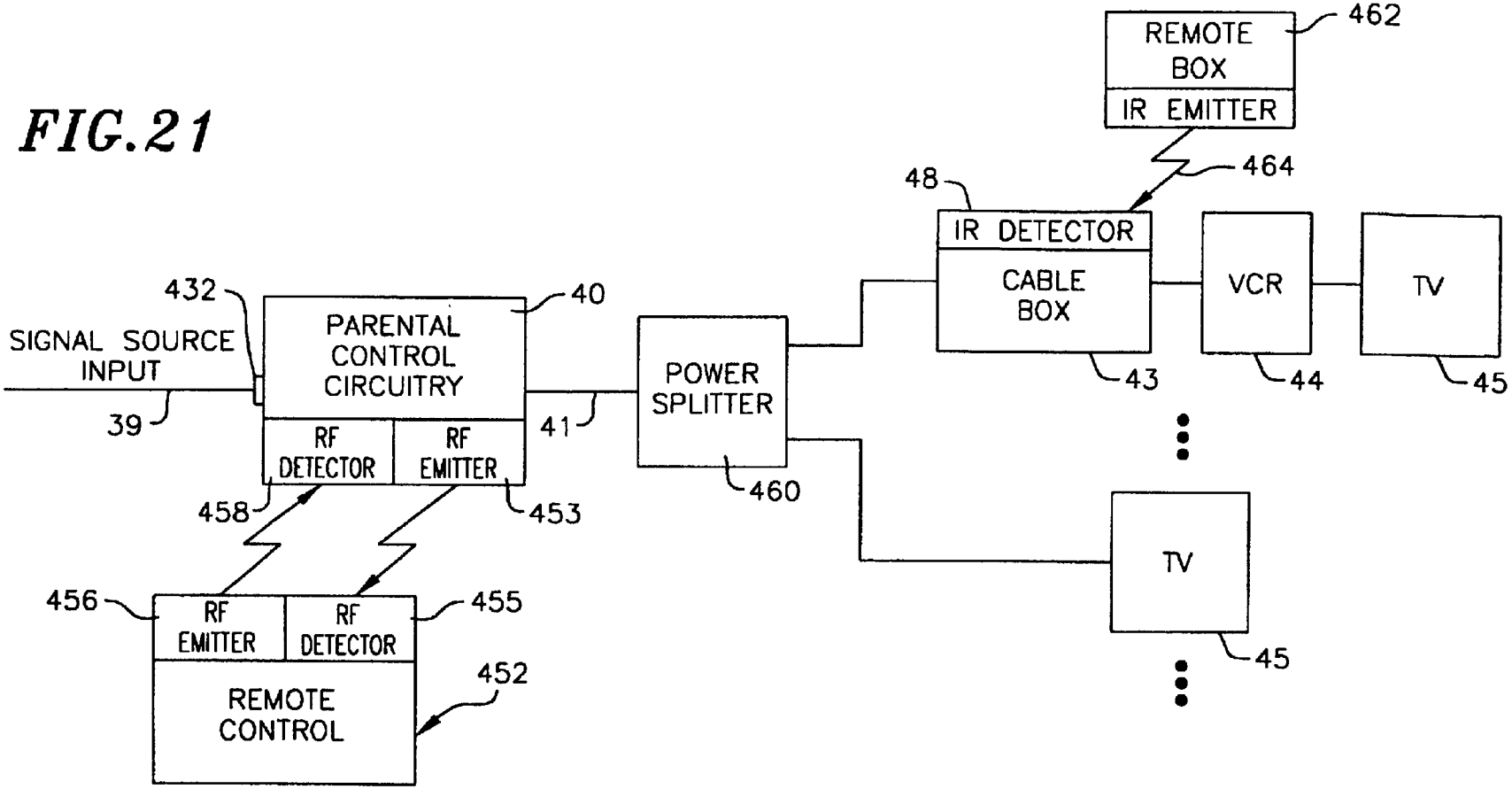
FIG. 21 is a schematic showing a parental control device with a power splitter that is able to provide parental control for multiple cable boxes and television receivers according to the present invention.

FIG. 21 is a schematic showing a parental control device with a power splitter that is enabled to provide parental control for multiple cable boxes and television receivers. The signal source input line 39 is attached to the parental control circuitry 40 via a tamper proof connector 432. The output of parental control circuitry 40 and parental control output line 41 is sent to power splitter 460, which then distributes the signals out to multiple cable boxes 43 or televisions 45. In this case, because the parental control circuity is common for a household or possibly an entire apartment building, the parental control circuitry 40 is most likely remote from the location of the parents or the authorities that will exercise control over the parental control circuitry. Thus, a remote controller with an infrared link to the parental control circuity may be inadequate. FIG. 21 shows a remote control 452 that is similar to the remote controller 12 except that remote control 452 has an RF detector 455 and a RF emitter 456. Similarly, the parental control circuitry 40 has a RF emitter 453 and a RF detector 458. The remote control 452 would send commands to the parental control circuitry 40 via RF emitter 456 and RF detector 458. The parental control circuitry 40 responds with a list, for example, of programs to be enabled to the remote control 452 via RF emitter 453 and RF detector 455. A display (not shown) on remote control 452 or on a television monitor near remote control 452, can display the list of enabled programs. The users at each location have their own remote controller 462 which would be used to tune cable boxes 43 or televisions 45, as required. However, if the user is tuned to a channel that has not been enabled, then viewing of that channel is effectively blocked by the parental control circuity 40.

Thus, there has been described apparatus and methods for improved parental control of television use and improved parental control of multiple televisions attached to a common signal source.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A system for exercising access control over a television program comprising:

a memory for storing television program schedule information including program titles for a plurality of television programs;

a monitor for displaying some of the schedule information including program titles;

an input device for selecting one of the displayed program titles for viewing a television program represented by the selected program title; and a parental control circuit for blocking the selected television program from being viewed as a function of the television program schedule information.

2. The system of claim 1 wherein the television program schedule information comprises a telecast channel, a telecast time and a length of telecast for each of the television programs, and wherein the control circuit acquires control of a channel of a television signal corresponding to a telecast channel of one of the television programs when a telecast time of the television program equals current time, and blocks the channel for a duration equal to the length of the telecast of the television program.

3. The system of claim 2 wherein the control circuit further comprises a second memory for storing the television program schedule information for the selected program title.

4. The system of claim 3 wherein the television program schedule information for the selected program title are stored in a second memory in temporal order.

5. The system of claim 1 further comprising a blocking circuit for blocking a plurality of program scenes from being viewed wherein, an indication of a program scene to be blocked is retrieved from a television signal.

6. The system of claim 1 further comprising blocking circuit for blocking the display of schedule information on the display monitor for a blocked channel.

7. The system of claim 6 wherein the input device comprises a remote controller having at least a first key for selectively positioning a cursor on a television program displayed on the monitor, and a second key for selecting the displayed program title.

8. The system of claim 1 further comprising a vertical blanking interval decoder for extracting the television program schedule information from a vertical blanking interval portion of a television signal and storing the television program schedule information to the memory.

9. A method for controlling access to television programs comprising the steps of:

displaying television program schedule information including program titles for a plurality of television programs on a monitor;

marking a program title from the displayed schedule information; and blocking a television program represented by the marked program title from being displayed on the monitor as a function of the television program schedule information for a selected title.

10. The method of claim 9 further comprising the step of blocking a plurality of program scenes from being viewed wherein, an indication of a program scene to be blocked is retrieved from a television signal.

11. The method of claim 9 wherein the marking step further comprises the step of selectively positioning a cursor on a displayed television title, and activating an input device for entering the marked program title into a memory.

12. The method of claim 9 further comprising the step of extracting the television program schedule information from a vertical blanking interval portion of a television signal and storing the extracted television program schedule information in a memory.

13. The method of claim 9 further comprising the step of selectively tuning to a channel of a television signal, and wherein the blocking step further comprises the step of controlling a tuner to block the selectively tuned channel from the monitor.

14. A system for exercising access control over a television program comprising:

a memory for storing television schedule information including program titles for a plurality of television programs;

a monitor for displaying some of the schedule information including program titles;

an input device for selecting one of the displayed program titles for viewing a television program represented by the selected program title; and a parental control circuit for blocking a plurality of program scenes from the selected television program from being viewed as a function of information retrieved from a television signal.

15. The system of claim 14 further comprising a vertical blanking interval decoder for retrieving information from a vertical blanking interval portion of the television signal and storing the retrieved information in the memory.

16. A method for controlling access to television programs comprising the steps of:

storing television program schedule information including program titles for a plurality of television programs;

displaying the television program schedule information including program titles on a monitor;

selecting a program title from the displayed schedule information; and blocking a program scene from a television program represented by the selected program title from being displayed on the monitor as a function of the information retrieved from a television signal.

17. The method of claim 16 further comprising the step of extracting the information for blocking program scenes from a vertical blanking interval portion of the television signal and storing the extracted television program schedule information in a memory.

*18. A system comprising:*

*a television tuner that supplies video signals to a video display; and*

*a processor configured to block the television tuner from supplying video signals of television programs that meet one or more user selected program content rating criteria to the video display;*

*said processor being further configured to allow a user to override the blocking of the video signals of television programs that meet the user selected program content rating criteria until the system is shut off.*

*19. The system of claim 18 wherein the one or more user selected program content rating criteria comprise a plurality of program content rating criteria.*

*20. The system of claim 19 wherein the processor is configured to override the blocking of one or more of the plurality of program content rating criteria.*

*21. The system of claim 18 wherein the processor is configured to override the blocking of the display of television programs that meet the user selected program content rating criteria if the user enters a predetermined code.*

*22. The system of claim 18 further comprising:*

*a memory in which is stored television program schedule information including program titles for a plurality of television programs;*

*wherein the processor is configured to block the television tuner based on the television schedule information stored in the memory.*

*23. The system of claim 18 further comprises a filter wherein the processor is configured to block the television tuner by controlling the operation of the filter.*

*24. A system comprising:*

*a television tuner that supplies video signals to a video display; and*

*a processor configured to block the television tuner from supplying video signals of television programs that meet one or more of a plurality of user selected program blocking criteria to the video display;*

*said processor being further configured to allow a user to override the plurality of user selected blocking criteria from being used to block the display of television programs until the system is shut off.*

*25. The system of claim 24 wherein the program blocking criteria comprises ratings criteria.*

*26. The system of claim 24 wherein the program blocking criteria comprises channels.*

*27. The system of claim 24 wherein the program blocking criteria comprises combinations of time and channel.*

*28. The system of claim 24 wherein the program blocking criteria comprises combinations of time, channel and length.*

*29. The system of claim 24 further comprising:*

*a memory in which is stored television program schedule information including program titles for a plurality of television programs;*

*wherein processor is configured to block the television tuner based on comparisons between the user selected blocking criteria and the television schedule information stored in the memory.*

*30. The system of claim 24 wherein the processor is configured to override the blocking of the display of television programs that meet the plurality of user selected blocking criteria if the user enters a predetermined code.*

*31. The system of claim 24 further comprises a filter wherein the processor is configured to block the television tuner by controlling the operation of the filter.*

*32. A system comprising:*

*one or more memories that store television program schedule information for a plurality of television programs and one or more viewing restrictions;*

*a display generator that supplies signals for a display of information for at least one of the television programs from the program schedule information to a video display; and*

*a processor configured to accept selections of displayed television program information, determine if one or more of the viewing restrictions is met for the selected television program and block the display of the selected television program based on the determination;*

*said processor being further configured to allow a user to override the blocking of the display of television programs based on one or more of the viewing restrictions and subsequently allowing the user to restore the blocking of the display of television programs based on the overridden viewing restrictions.*

*33. The system of claim 32 wherein processor is configured to subsequently allow the user to restore the blocking of the display of television programs by the system being shut off.*

*34. The system of claim 32 wherein processor is configured to subsequently allow the user to restore the blocking of the display of television programs by pressing one or more predetermined button on control.*

*35. The system of claim 32 wherein at least one of the viewing restrictions comprise one or more television programs selected by a user.*

*36. The system of claim 32 wherein at least one of the viewing restrictions comprise program content rating criteria.*

*37. The system of claim 32 wherein the processor is configured to override the blocking of the display of television programs if the user enters a predetermined code.*

*38. A system comprising:*

*means for supplying selective video signals to a video display; and*

*means for blocking the means for supplying from supplying video signals of television programs that meet one or more user selected program content rating criteria to the video display; and*

*means for overriding the blocking by the means for blocking of the video signals of television programs that meet the user selected program content rating criteria until the system is shut off.*

*39. The system of claim 38 wherein the one or more user selected program content rating criteria comprise a plurality of program content rating criteria.*

*40. The system of claim 39 wherein the means for overriding further comprise means for the blocking of one or more of the plurality of program content rating criteria.*

*41. The system of claim 38 wherein the means for overriding further comprises means for overriding the blocking of the display of television programs that meet the user selected program content rating criteria if a user enters a predetermined code.*

*42. The system of claim 38 further comprising:*

*means for storing television program schedule information including program titles for a plurality of television programs;*

*wherein the means for blocking blocks the means for supplying based on the television schedule information stored in the memory.*

*43. A system comprising:*

*means for supplying selective video signals to a video display;*

*means for blocking the means for supplying from supplying video signals to the video display of television programs that meet one or more of a plurality of user selected program blocking criteria; and*

*means for overriding the blocking by the means for blocking of the video signal of television programs that meet the plurality of user selected blocking criteria from being used to block the display of television programs until the system is shut off.*

*44. The system of claim 43 wherein the program blocking criteria comprises ratings criteria.*

*45. The system of claim 43 wherein the program blocking criteria comprises channels.*

*46. The system of claim 43 wherein the program blocking criteria comprises combinations of time and channel.*

*47. The system of claim 43 wherein the program blocking criteria comprises combinations of time, channel and length.*

*48. The system of claim 43 further comprising:*

*means for storing television program schedule information including program titles for a plurality of television programs;*

*wherein the means for blocking blocks the means for supplying based on the television schedule information stored in the memory.*

*49. The system of claim 43 wherein the means for overriding the display of television programs that meet the plurality of user selected program content rating criteria overrides if a user enters a predetermined code.*

*50. A system comprising:*

*means for storing television program schedule information for a plurality of television programs and one or more viewing restrictions;*

*means for generating a display of information for at least one of the television programs from the program schedule information for display on a video display;*

*means for accepting selections of displayed television program information, determining if one or more of the viewing restrictions is met for the selected television program and blocking the display of the selected television program based on the determination; and*

*means for overriding the blocking of the display of television programs based on one or more of the viewing restrictions and subsequently allowing the user to restore the blocking of the display of television programs based on the overridden viewing restrictions.*

*51. The system of claim 50 wherein the means for overriding further subsequently allows the restoration of the blocking of the display of television programs by the system being shut off.*

*52. The system of claim 50 wherein the means for overriding further subsequently allows the restoration of the blocking of the display of television programs by pressing one or more predetermined button on control.*

*53. The system of claim 50 wherein at least one of the viewing restrictions comprise one or more television programs selected by a user.*

*54. The system of claim 50 wherein at least one of the viewing restrictions comprise program content rating criteria.*

*55. The system of claim 50 wherein the means for overriding further comprises means for overriding the blocking of the display of television programs that meet the user selected program content rating criteria if a user enters a predetermined code.*

*56. A method comprising:*

*supplying selective video signals to a video displays;*

*blocking the supplying of video signals to the video display of television programs that meet one or more user selected program content rating criteria;*

*overriding the blocking of television programs that meet the user selected program content rating criteria until the shutting off of a system that displays the television programs.*

*57. The method of claim 56 wherein the one or more user selected program content rating criteria comprise a plurality of program content rating criteria.*

*58. The method of claim 57 wherein the overriding further comprise blocking of one or more of the plurality of program content rating criteria.*

*59. The method of claim 56 wherein the overriding is performed after a user enters a predetermined code.*

*60. The method of claim 56 further comprising:*

*storing television program schedule information including program titles for a plurality of television programs;*

*wherein the blocking blocks the supplying based on the television schedule information stored in the memory.*

*61. A method comprising:*

*supplying selective video signals to a video displays;*

*blocking the supplying video signals to the video display of television programs that meet one or more of a plurality of user selected program blocking criteria to the video display; and*

*overriding the blocking of television programs that meet the plurality of user selected blocking criteria from being used to block the display of television programs until the shutting off of a system that displays the television programs.*

*62. The method of claim 61 wherein the program blocking criteria comprises ratings criteria.*

*63. The method of claim 61 wherein the program blocking criteria comprises channels.*

*64. The method of claim 61 wherein the program blocking criteria comprises combinations of time and channel.*

*65. The method of claim 61 wherein the program blocking criteria comprises combinations of time, channel and length.*

*66. The method of claim 61 further comprising:*

*storing television program schedule information including program titles for a plurality of television programs;*

*wherein the blocking blocks the supplying based on the television schedule information stored in the memory.*

*67. The method of claim 61 wherein the overriding is performed after a user enters a predetermined code.*

*68. A method comprising:*

*storing television program schedule information for a plurality of television programs and one or more viewing restrictions;*

*generating a display of information for at least one of the television programs from the program schedule information for display on a video display;*

*accepting selections of displayed television program information, determining if one or more of the viewing restrictions is met for the selected television program and blocking the display of the selected television program based on the determination;*

*overriding the blocking of the display of television programs based on one or more of the viewing restrictions and subsequently allowing the user to restore the blocking of the display of television programs based on the overridden viewing restrictions.*

*69. The method of claim 68 wherein the overriding further subsequently allows the restoration of the blocking of the display of television programs by the shutting off of a system that performs the displaying television programs.*

*70. The method of claim 68 wherein the overriding further subsequently allows the restoration of the blocking of the display of television programs by pressing one or more predetermined button on a control.*

*71. The method of claim 68 wherein at least one of the viewing restrictions comprise one or more television programs selected by a user.*

*72. The method of claim 68 wherein at least one of the viewing restrictions comprise program content rating criteria.*

*73. The method of claim 68 wherein the overriding is performed after a user enters a predetermined code.*

* * * * *

UNITED STATES PATENT AND TRADEMARK OFFICE

CERTIFICATE OF CORRECTION

PATENT NO. : RE41,993 E
APPLICATION NO. : 10/720006
DATED : December 7, 2010
INVENTOR(S) : Henry C. Yuen et al.

It is certified that error appears in the above-identified patent and that said Letters Patent is hereby corrected as shown below:

On the Title Page, under Item (63) U.S. Applications:
line 4 of the paragraph, after "5,949,471," change "and" to --which is--;
line 5 of the paragraph, after "abandoned," change "and" to --which is--;
line 7 of the paragraph, after "5,382,983," change "and" to --which is--.

Claim 4, column 19, line 28, change "are" to --is--.

Claim 6, column 19, line 34, after "comprising" insert --a--.

Claim 29, column 21, line 34, after "wherein" insert --the--.

Claim 33, column 21, line 64, after "wherein" insert --the--.

Claim 34, column 22, line 1, after "wherein" insert --the--.

Claim 34, column 22, line 4, change "button" to --buttons-- and after "on" insert --a--.

Claim 52, column 23, line 32, change "button" to --buttons-- and after "on" insert --a--.

Claim 56, column 23, line 45, change "displays" to --display--.

Claim 58, column 23, line 57, change "comprise" to --comprises--.

Claim 61, column 24, line 4, change "displays" to --display--.

Claim 70, column 24, line 54, change "button" to --buttons--.

Signed and Sealed this
Ninth Day of August, 2011

David J. Kappos

David J. Kappos
*Director of the United States Patent and Trademark Office*